United States Patent
Al-Ghizzy

(10) Patent No.: US 11,828,201 B2
(45) Date of Patent: Nov. 28, 2023

(54) ENHANCED THERMOUTILIZER

(71) Applicant: Husham Al-Ghizzy, Brownsville, TX (US)

(72) Inventor: Husham Al-Ghizzy, Brownsville, TX (US)

(*) Notice: Subject to any disclaimer, the term of this patent is extended or adjusted under 35 U.S.C. 154(b) by 0 days.

(21) Appl. No.: 17/193,276

(22) Filed: Mar. 5, 2021

(65) Prior Publication Data
US 2021/0293157 A1    Sep. 23, 2021

Related U.S. Application Data

(62) Division of application No. 15/442,291, filed on Feb. 24, 2017, now Pat. No. 10,961,874.

(60) Provisional application No. 62/451,780, filed on Jan. 30, 2017, provisional application No. 62/425,777, filed on Nov. 23, 2016, provisional application No. 62/328,663, filed on Apr. 28, 2016, provisional application No. 62/308,180, filed on Mar. 14, 2016, provisional application No. 62/304,216, filed on Mar. 6, 2016.

(51) Int. Cl.
F01K 25/06    (2006.01)
F01K 27/00    (2006.01)
F03B 13/08    (2006.01)

(52) U.S. Cl.
CPC ............ F01K 25/06 (2013.01); F01K 27/00 (2013.01); F03B 13/08 (2013.01)

(58) Field of Classification Search
CPC ........ F01K 25/065; F01K 25/06; F25B 15/04
See application file for complete search history.

(56) References Cited

U.S. PATENT DOCUMENTS 1,781,541 A    11/1930  Einstein et al.
3,243,359 A    3/1966   Schmidt
(Continued)

FOREIGN PATENT DOCUMENTS

CN    203533960        4/2014
GB    1550741          8/1979
JP    2013228120 A  *  11/2013

OTHER PUBLICATIONS

Machine translation of JP-2013228120-A, accessed Jun. 18, 2022. (Year: 2022).*

(Continued)

Primary Examiner — Jonathan R Matthias

(57) ABSTRACT

A thermal utilization system is capable of producing power, storing energy via a chemical or and a hydropower-elevation means. It also capable of transport fluid as vapor over obstacles and terrains, as well as desalinate water. It may in some embodiments do all or some of these tasks simultaneously and with the same amount of energy. It may run with any source of energy including renewable energy sources such as solar energy, and wind. The system may use that energy to run a heat engine and, at the same time, stores that energy via chemical separation. When energy is needed, the system may withdraw the chemical substances and lets them interact to claim the energy back, and then use it to run a heat engine and desalinate water. Some parts of the system can be used for cooling and heating. The system may be configured to be an air conditioner unit or a refrigerator that has an internal back up energy storage.

7 Claims, 17 Drawing Sheets

(56) References Cited

U.S. PATENT DOCUMENTS

| | | | |
|---|---|---|---|
| 3,425,914 A | | 2/1969 | Kanaan |
| 3,458,445 A | | 7/1969 | Macriss et al. |
| 3,945,211 A | * | 3/1976 | Rowe ............... F02G 1/043 60/508 |
| 4,009,575 A | * | 3/1977 | Hartman, Jr. ........ F25B 27/00 422/243 |
| 4,094,747 A | | 1/1978 | Pfenninger |
| 4,100,756 A | | 7/1978 | Albertson |
| 4,291,232 A | * | 9/1981 | Cardone ............ F01K 25/065 60/671 |
| 4,292,808 A | * | 10/1981 | Lohmiller ........... F01K 21/06 60/649 |
| 4,303,121 A | | 12/1981 | Pangborn |
| 4,386,501 A | | 6/1983 | Jaeger |
| 4,403,643 A | | 9/1983 | Minto |
| 4,801,393 A | | 1/1989 | Erikson |
| 4,823,864 A | | 4/1989 | Rockenfeller |
| 4,966,014 A | | 10/1990 | Erickson |
| 5,666,818 A | | 9/1997 | Manrique-Valadez |
| 6,389,841 B1 | | 5/2002 | Feldman, Jr. et al. |
| 8,080,138 B2 | | 12/2011 | Nirmalakhandan et al. |
| 8,341,961 B2 | | 1/2013 | Glynn |
| 8,545,681 B2 | | 10/2013 | Shapiro et al. |
| 8,881,539 B1 | | 11/2014 | El-Shaarawi et al. |
| 10,961,874 B2 | | 3/2021 | Al-Ghizzy |
| 2010/0024645 A1 | | 2/2010 | Tonkovich et al. |
| 2011/0048502 A1 | | 3/2011 | Kikinis et al. |
| 2014/0069859 A1 | | 3/2014 | Hanks |
| 2016/0084114 A1 | | 3/2016 | Al-Ghizzy |
| 2016/0194217 A1 | | 7/2016 | Al-Ghizzy |
| 2017/0254315 A1 | | 9/2017 | Al-Ghizzy |

OTHER PUBLICATIONS

Mustafas; "Separation Technique, Ways to Separate Mixtures"; Fuuasti, Karachi, Pakistan, 35 pages; retrieved from the internet: http://chem-fuuast.weebly.com/uploads/1/2/8/9/12894433/separation_techniques_by_dr._sana_mustafa.pdf.

Abdulrahim et al.; "Thermal Desalination and Air Conditioning Using Absorption Cycle", Research Gate, Sep. 2015, retrieved from the internet: https://www.researchgate.net/publication/281809210_Thermal_desalination_and_air_conditioning_using_absorption_cycle.

Martin et al. "Brackish Water Desalination—Energy and Cost Considerations"; Energy Recovery Inc., San Leandro, Ca, 6 pages, retrieved from the internet: http://www.energyrecovery.com/wp-content/uploads/2014/12/BRACKISH-WATER-DESALINATION-ENERGY-AND-COST-CONSIDERATIONS.pdf.

Definition of Trap (plumbing) from Wikipedia, 4 pages; retrieved from the internet: https://en.wikipedia.org/wiki/Trap_(plumbing).

Definition of Hookah, from Wikipedia, 19 pages, retrieved from the internet: https://en.wikipedia.org/wiki/Hookah#/media/File:Hookah-lookthrough.svg.

Scheffler Dish based Solar System; Operations & Maintenance Manual, Ministry of New and Renewable Energy, Government of India, Nov. 2014, 56 pages; retrieved from the internet: http://mnre.goy.in/file-manager/UserFiles/CST-Manuals/Scheffler%20Dish_E.pdf.

Water Desalination Using Renewable Energy—Technology Brief, IEA-ETASAP and IRENA Technology Brief 112—Mar. 2012, 28 pages, retrieved from the internet: https://www.irena.org/DocumentDownloads/Publications/IRENA-ETSAP%20Tech%20Brief%20I12%20Water-Desalination.pdf.

Asiedu-Boateng, et al., "Comparison of the Cost of Co-Production of Power and Desalinated Water from Different Power Cycles", Energy and Power Engineering, 2013, 10 pages, retrieved from the internet: http://file.scirp.org/pdf/EPE_2013010415544251.pdf.

International Search Report and Written Opinion issued in International Application No. PCT/US2017/20868 dated Jun. 30, 2017; 20 pages.

Waste heat recover: Technology and Opportunities in US Industry, US Dept. Energy, 112 pages http://www1.eere.energy.gov/manufacturing/intensiveprocesses/pdfs/waste_heat_recovery.pdf.

Mehos; Overview of Concentrating Solar Power Technologies; National Renewable Energy Laboratory, Jun. 21, 2007, 43 pages, retrieved from the internet: http://www.energy.ca.gov/reti/environmental_com/2008-04-04_CCP_OVERVIEW.PDF.

Micheletti; Emerging Issues and Needs in Power Plant Cooing Systems; 14 pages, retrieved from the internet: http://www.forestry.state.nv.us/hearings/past/springetal/browseabledocs/Exhibits%5CSNWA%20Exhibits/SNWA_Exh_123_Micheletti%20and%20Burns.%202002.pdf.

Lianying et al. "Optimum Design of Cogeneration for Power and Desalination to Satisfy the Demand of Water and Power", ELSEVIER, Science Direct, 7 pages; 2013; retrieved from the internet: http://waterlib.it/wp-content/uploads/2015/06/1-s2.0-S0011916413002750-main.pdf.

International Energy Agency; "Co-generation and Renewables" May 2011, retrieved from the internet: http://www.southwestchptap.org/Data/publications/CoGeneration_Renewables-SolutionsforLowCarbonEnergyFuture.pdf.

Rizza—Ammonia Water Low Temperature Thermal Storage System—Abstract ASME digital collection; retrieved from the internet: http://solarenergyengineering.asmedigitalcollection.asme.org/article.aspx?articleid=1455791.

Oberhofer, "Energy Storage Technologies and Their Role in Renewable Integration", Global Energy Network Inst. Jul. 2012, 42 pages, retrieved from the internet: http://www.geni.org/globalenergy/research/energy-storage-technologies/Energy-Storage-Technologies.pdf.

Electrical Energy Storage, white paper by IEC, 78 pages, retrieved from the internet: http://www.iec.ch/whitepaper/pdf/iecWP-energystorage-LR-en.pdf.

Gomri; Solar Energy to Drive Absorption Cooling Systems Suitable for Small Building Applications:, ESLIC-10-10-81, 8 pages, proceedings of the 10$^{th}$ international conference enhanced building operations, Kuwait, Oct. 26-28, 2010; retrieved from the internet: http://oaktrust.library.tamu.edu/bitstream/handle/1969.1/94132/ESL-IC-10-10-81.pdf?sequence=1.

Liberman, Boris, "The importance of energy recovery devices in reverse osmosis," www.twdb.texas.gov/publications/reports/numbered_reports/doc/R363/C8.pdf, IDE Technologies Ltd., available on or before Feb. 27, 2017, pp. 1-9.

Gunther, M., and Shahbazfar, R.,"Chapter 7: Solar Dish Technology," in *Advanced CSP Teaching Materials*, available on or before Jul. 14, 2015, pp. 1-63.

\* cited by examiner

ENHANCED THERMOUTILIZER

CROSS-REFERENCE TO RELATED APPLICATION

This application is a divisional of and claims the benefit of priority to U.S. patent application Ser. No. 15/442,291, filed on Feb. 24, 2017, entitled "Enhanced Thermoutilizer", which claims the benefit of U.S. Provisional Application No. 62/304,216, filed on Mar. 6, 2016, entitled "Enhance Thermal Utilization System", and U.S. Provisional Application No. 62/308,180, filed on Mar. 14, 2016, entitled "Absorption Desalination System and Methods", and U.S. Provisional Application No. 62/328,663, filed on Apr. 28, 2016, entitled "Thermal Utilization and Energy Storage System", and U.S. Provisional Application No. 62/425,777, filed on Nov. 23, 2016, entitled "Theromutilizer, Desalinator and Energy Storage System", and U.S. Provisional Application No. 62/451,780, filed on Jan. 30, 2017, entitled "Enhanced Thermoutilizer", the entire contents of each incorporated.

BACKGROUND

Thermoelectric systems, solar heat engines, and internal combustion engines yield heat as a by-product of producing mechanical or electrical power. Thermoelectric systems use cooling towers (wet) and cooling units (dry) to reject their heat. Desalination plant may couple to thermal electrical plants. Energy storage devices may couple to concentrated solar power plants.

SUMMARY

A thermal utilization system is a multipurpose, multitask plant/system. For example, the system may provide power generation, energy storage via chemical or and hydropower-elevation, desalination, and/or fluid transportation as vapor (such as water) to overcome distances and obstacles, such as natural terrains. The system may also provide cooling and heating. The system may accomplish some or all of these tasks simultaneously and with the same amount of energy with which is conventionally used to run only one or some of the tasks. The system may use most sources of energy including waste heat, and renewable energies. In some implementations, cooling towers and cooling units may be replaced for the thermoelectric power plants. It may in some embodiments introduce significant improvements for the solar heat engines, especially the solar dish engines particularly the solar Stirling engines by cooling them without substantial energy loss or reducing energy loss and, at the same time, storing their thermal energy for later use.

In some aspects, a thermal utilization system includes a separator/energy storage system and a utilizer/energy claiming system. The energy storage system receives a saturated solution and separates the saturated solution into a working fluid and a working solution. The working fluid and the working solution may react exothermically. The fluids may be, for example, ammonia and water, lithium bromide and water, calcium chloride and water, or other exothermically reacting substances. The energy claiming system receives and enables the working fluid and the working solution to interact for example, in an exothermic reaction to generate energy, which may yield a saturated solution. The system may be a closed or an open cycle. In other aspects, heat sources may provide heat to drive the separator. Heat engines such as Stirling engine may be used to transfer heat to and from the system while generating power.

In specific embodiments, the present disclosure provides a multitask system that can produce power and store energy to be claimed later. It may provide desalination/distillation, as well as also provide cooling or refrigeration and heating. The system may be configured to work in open-cycle mode for doing desalination/distillation or other suitable applications or work in closed-cycle mode.

In some embodiments, it can be configured to switch between the closed and the open-cycle modes. The system may be used to transport fluid for distances and over terrains and obstacles. The system may replace cooling units (wet/dry) of power systems and other systems, systems, or applications where heat is rejected, such as solar heat engines and Stirling engines. The system may be run with a compressor/vacuum pump also.

In these or other embodiments, the system may be configured to provide heating and cooling directly by using the heat of system parts such as the utilizer and the low temperature of the evaporator. The system heat engines may also power air conditioners, coolers, and refrigerators directly or indirectly such as by mechanical or electrical means.

In these or other embodiments, the system may transport fluid such as water as vapor for distances and over terrains and obstacles. This may be done, for example with a fluid transport apparatus, or by linking the evaporation unit of the system with an absorption unit and also by linking more than one system. Absorbents and/or other devices and methods can be used to do this task of the system. Fans, pumps, and heaters may be used to assist in the fluid transfer.

In these or other embodiments, the system may be run with a compressor/vacuum pump/fan. The pump may run with a wind turbine, solar VP panels, or any other power sources.

In these or other embodiments, the system may include storage tanks, heat engines, a separator, a utilizer/mixer, condensers, and/or an evaporator. The system may also use chemical substances such as absorbents, inert gases, neutralizing substances, retardants, and additives. Elevation and hydropower equipment and devices, such as hydro pumps and hydro generators, can be used by this system; it also may comprise interaction prevention controllers to balance the system pressure and to ensure safety. When the evaporator is used as a boiler, the system may use a turbine to harness the boiler pressure. The system may use different types of energy and fuels including renewable energy, especially solar energy. Thermal step-down attachments can be used to lower the heat transfer from heat sources to the system fluids and parts.

In these or other embodiments, elements of the system may be repeated, multiplied, or omitted. They can be integrated, close, distributed, or apart, linked with each other via conduits or with pumps, or other transportation devices and means.

In these or other embodiments, the system may use chemical substances such as the working fluid, the working solution, and additives when needed. The system may use several chemical substances and additives as standalone substances and as mixed substances.

In these or other embodiments, the system may use interaction prevention controllers and methods, such as pressure equalizer conduits, switching valves, and one-way valves, in addition to interaction prevention devices and inflatable/expandable tank bags/membranes/diaphragms, which can be multilayers and/or mutable chambers. The storage tanks may have one or several bags/diaphragms/champers, which can be any suitable shape, orientation, and material. An external pressure tank can be used. Neutralization substances and detecting devices can be used also. The system can use mixed mutable devices and methods to keep the system pressure and to ensure safety In these or other embodiments, an evaporator can be used for desalination/distillation. This desalination/distillation can also be done without the evaporator. Direct fluid injection (absorption) into the absorber can be used instead. The evaporator can also be used as a boiler to produce steam/pressure, which can be used to run a turbine. It may use a heat exchanger in this arrangement.

In these or other embodiments, the system may be operable to receive heat from a heat source, such as renewable energy. The system may store that energy via chemical separation. The system may use a heat engine between the heat source and the separator to make use of the heat before using it for separation. When energy is needed, the system withdraws the chemical substances and lets them interact to claim the energy back, then uses it to run a heat engine or other applications. It may use its power, especially the power of the heat engines, to run some internal applications such as pumps. The system power also can run external applications such as a reverse osmosis system/system. The system may use its power to do desalination, distillation, and separation. Some parts of the system can be used for cooling and heating.

In these or other embodiments, the system may use any separation method and means that run by any source of energy or power, directly or indirectly, to do the separation, such as multi-effect desalination/distillation, vapor compression, multi-stages desalination, or mixed methods can be used also. The separation of the working fluid from the working solution can be partial or complete separation.

In these or other embodiments, the system may use direct or indirect mixing/utilizing. The interaction can be a thermic reaction, electrical, or another form of energy or power generation. The system then uses the interaction/reaction to power systems or applications externally or internally such as powering a heat engine. The energy or power of the utilizer/mixer can be used for desalination, energy storage, and distillation or for other applications such as running heat engines.

In these or other embodiments, heat may be used for desalination, energy storage, and distillation or for other applications such as running heat engines. It can be switched or directed, for example, with conduit and thermal fluid to share heat engines or other applications; the heat sources of the system may sandwich the heat engines and other applications. Hot and cool parts of the system may sandwich a heat engine; for example, the absorber and the evaporator may share the same engines. Also, the absorber and the generator may share the same engines.

In these or other embodiments, the boiler/generator and the utilizer/absorber may be linked together or share the same vessel. Also, they may share the same heat engine. They may share heat engines with the other parts of the system, such as the evaporator and/or the heat exchangers.

In these or other embodiments, depending on the type of chemical substance and the applications that are being used, the system pressure can be high or low; in some situations, a pump can be used to counter atmospheric pressure and aid in balancing the pressure and for moving fluids. Elevation or height can be used for pressure balancing, and it may be used to run pumps and generators, such as using vertical tanks/mutable vertical tanks and mutable hydro generators. Vacuum and pressure can be used to manage and control the system fluids.

In these or other embodiments, wind energy, hydropower, photovoltaic (PV), and other sources of energy can be used to run part or all of the system, including the separation part.

In these or other embodiments, the system may use absorbents, absorption, absorption effects, and absorption substances for storing energy, then use them later to run heat engines or to run and power other applications, for desalination/distillation, and for transferring fluids, such as water.

The use of the evaporator and the utilizer can be continuous or alternatively or other patters.

Any future in one arrangement/method/diagram of the system may use in another arrangements/method/diagram of the system.

The heat engines may provide power to external devices such as an air-conditioner, reverse osmoses plant/system while storing energy as well as claiming the stored energy, in addition to water desalination/distillation when it's applicable. The heat engines may power the device mechanically or electrically. In some implementations, the evaporators can be used to provide cooling. Other arrangements or devices may be used for this method injectors may be use when the with the generator or with the evaporator when used as a boiler

DETAILED DESCRIPTION

Figure 1:
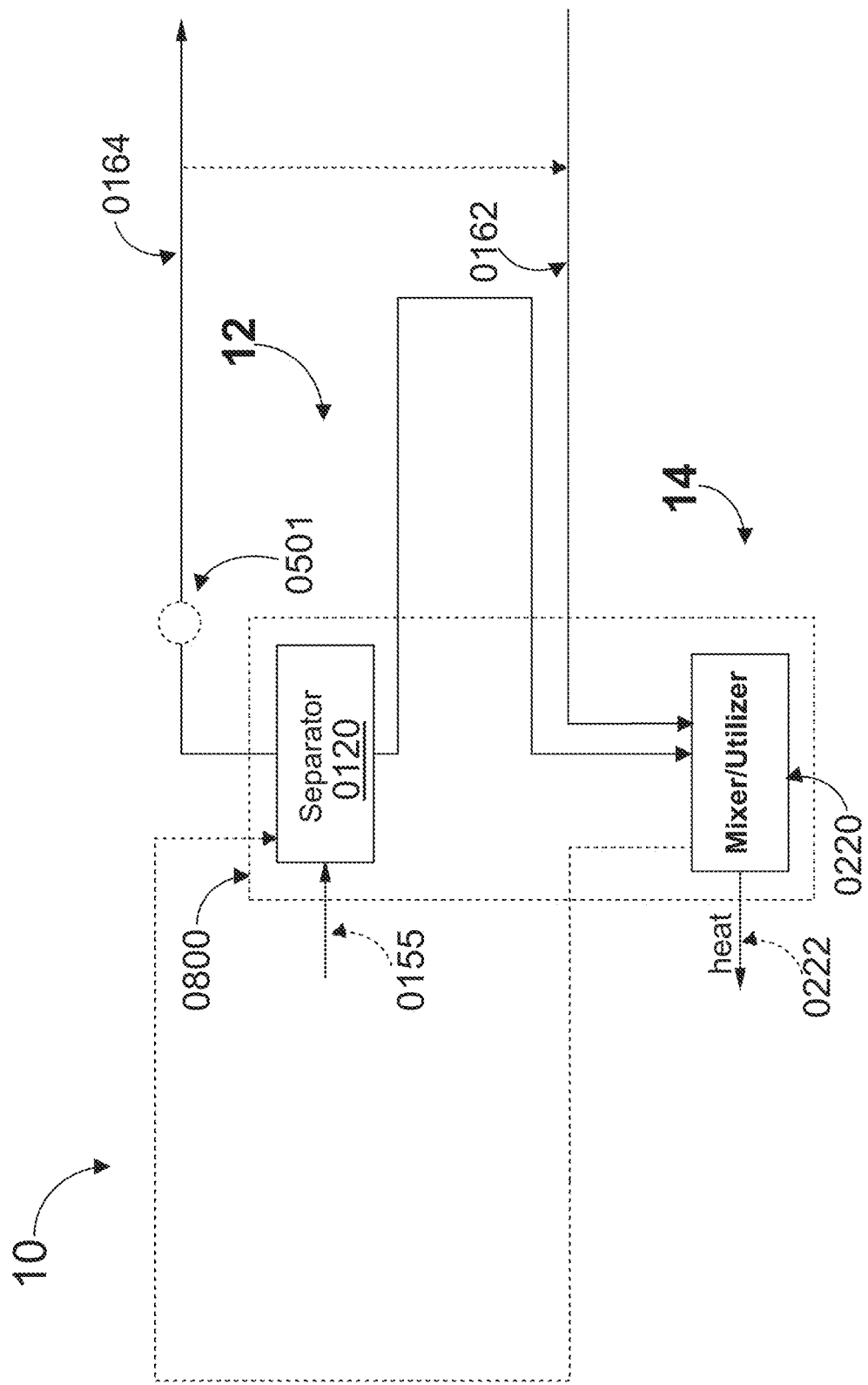
FIG. 1 is a schematic diagram illustrating the system in accordance with some aspects of the present disclosure.

Referring to FIG. 1, system 10 comprises a utilizer/mixer 220 that mixes, utilizes, or otherwise interacts a working solution and a working fluid to produce heat 222. The heat 222 may be used for power generation, desalination/distillation and other applications, internally or externally. The utilizer/mixer 220 may comprise a reaction tank or other suitable vessel. The utilizer may contain a working solution operable to react with a working fluid to produce power/energy. The working solution in the utilizer may absorb and transport the working fluid.

In operation of the utilizer 220, the working fluid introduced to the working solution via inlet 0162, which can be a conduit/fluid transferor apparatus. The utilizer/mixer 220 lets the working solution and the working fluid interact. The interaction may be a thermic reaction, electrical, or another form of power generation. The utilizer may use the interaction/reaction to power internal or external applications. For example, the rejected heat 0222 can be used for desalination, energy storage, distillation, driving a heat engine, or for other applications. The chemical substance that results from the reaction (by-product) which is a saturated solution will be sent to the separator 120.

The system 10 also comprises a separator 120 operable to separates the working fluid out of the saturated solution or to separates the saturated solution into a working solution and a working fluid. The separator may couple to encouragers such as a heat source 0155 and or mechanical mean such as a vacuum pump 0501. The heat source 0155 can be a single, multiple, and mix sources of renewable/nonrenewable energies.

In operation of the separator 120, the chemical saturated solution is pumped or drawn into the separator 0120 and the separator 0120 separates the working fluid out of the working solution. The separator 120 can be as basic as simple distiller; the system 10 may also use any other separation method, such as multi-effect desalination/distillation, vapor compression, and multi-stages desalination. Mixed methods can also be used. Of the separated substances, the separated working solution flows or is pumped to utilizer 0220, the working fluid sent to the utilizer and or discharge for consumption when the proses used for desalination/distillation. The separator 120 and the utilizer 220 may share the same vessel 800

Figure 2:
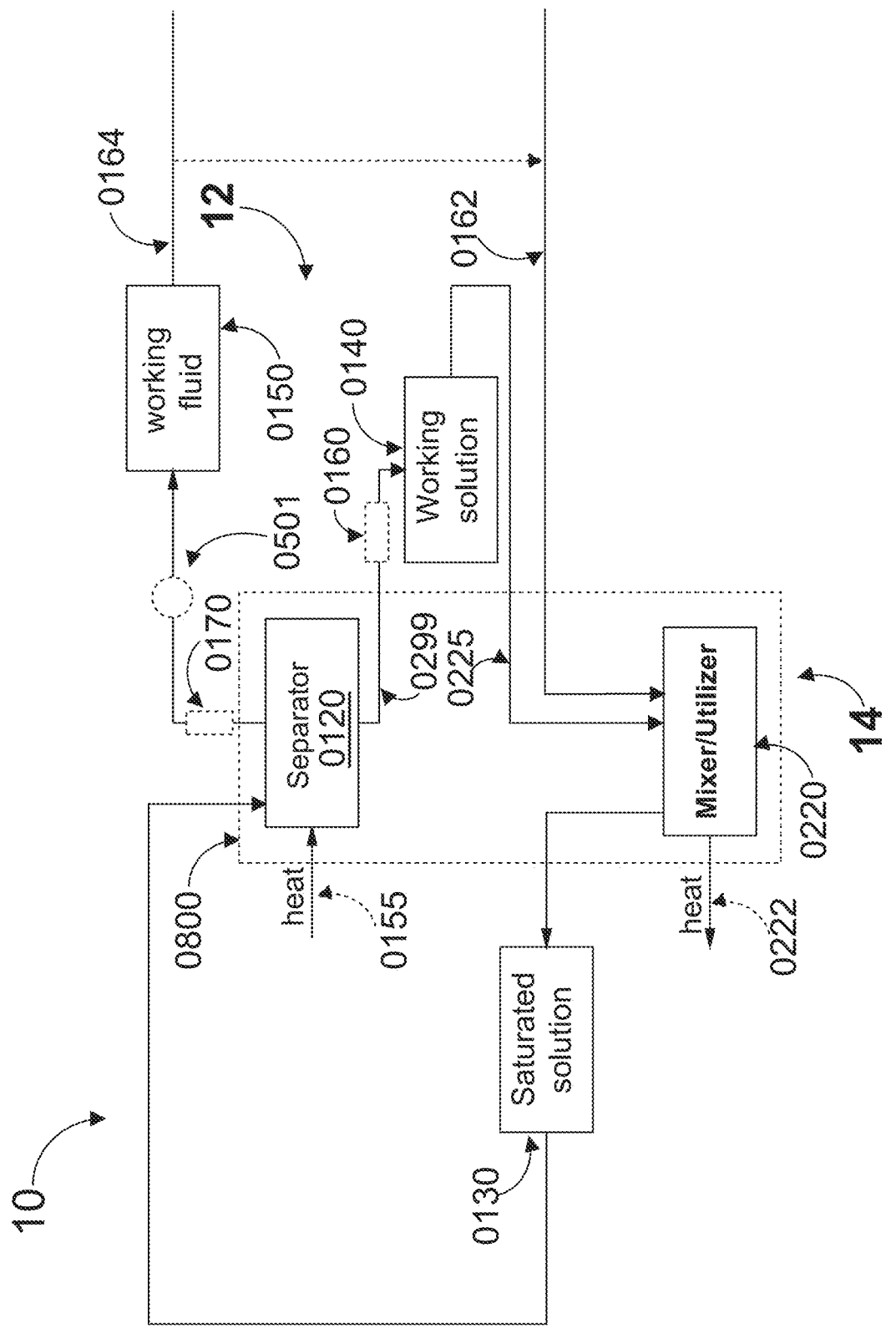
FIG. 2 is a schematic diagram illustrating the system with the energy storage devices in accordance with some aspects of the present disclosure.

Referring to FIG. 2, the system 10 may use energy storage devices such as tanks, so that it may stores energy for later use. The storage devices/tanks store the separated substances to be later chemically used to produce energy/power, the tanks may also use for hydropower storing and claiming. The storage tanks operable to receive and stores the system fluids. A work solution tank 140 may contain/store the working solution, a working fluid tank 150 may contain/store the working fluid, and a saturated solution tank 130 may contain/store the saturated fluid.

For illustration, the system 10 may be divided into several systems such as an energy storage system 12 and an energy claiming system 14. In operation of the energy storage system 12, the chemical saturated solution is pumped or drawn from the saturated solution tank 130 into the separator 0120 and the separator 0120 separates it into working fluid and working solution. The separated substances send to storage tanks 0140 and 0150.

In operation of the energy calming system 14, energy may be reclaimed. In one embodiment, when energy is needed, the energy generation system 14 withdraws the separated substances, the working fluid, and the working solution from tanks 140 and 150, and interacts them in the utilizer/mixer 0220. The utilizer 220 may in some embodiments be an absorber. The interaction may be a thermic reaction, electrical, or another form of power generation. The energy generation system 14 may use the interaction/reaction to power systems or applications internally or externally. For example, the rejected heat 0222 can be used for desalination, energy storage, distillation, driving a heat engine, or for other applications. The chemical substance that results from the reaction (by-product) will be sent to the saturated solution tank 0130 to be stored and be reused again. In the energy storage system 12 and energy claiming system 14, fluids may be pumped or otherwise flow between vessels.

Figure 3:
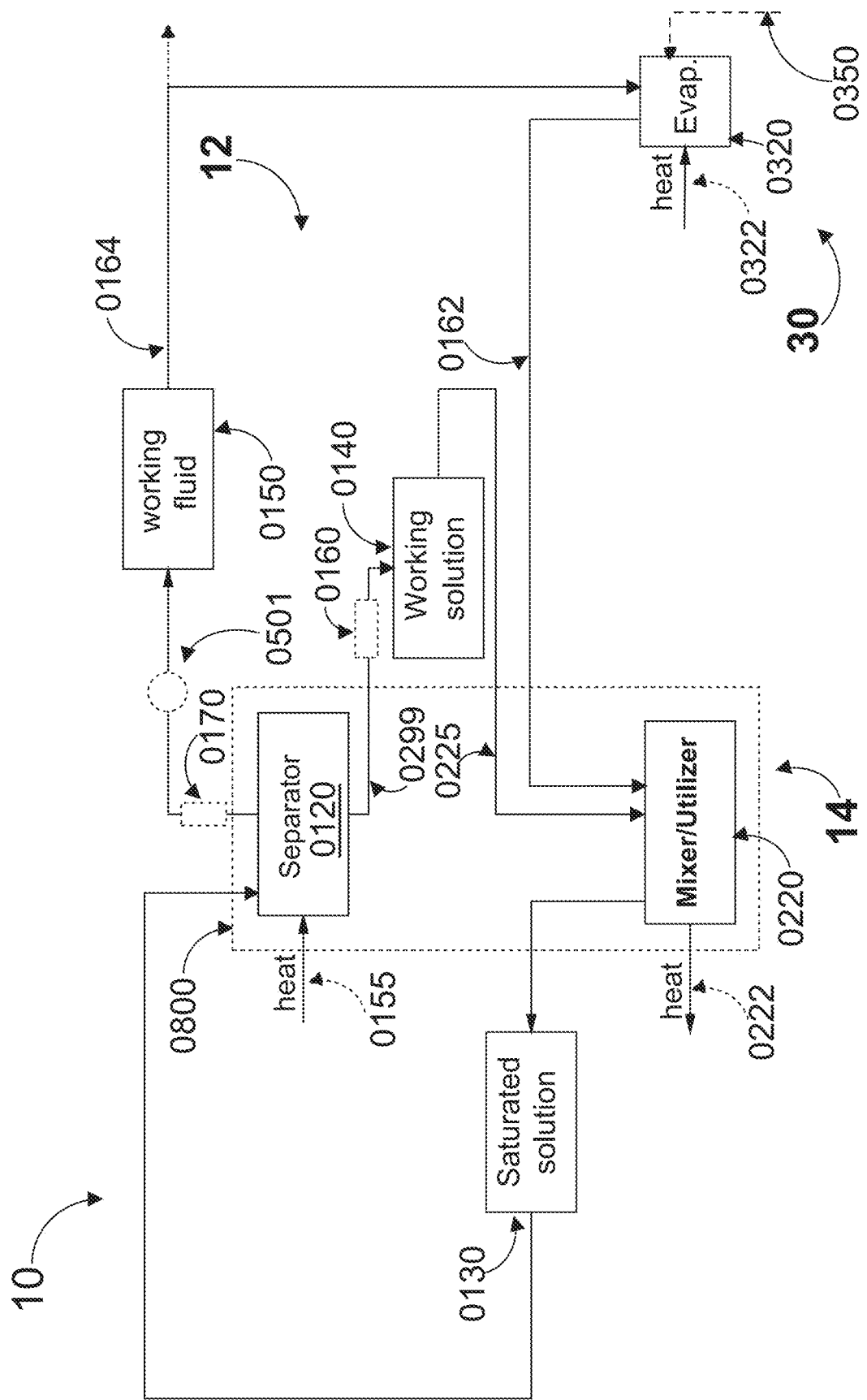
FIG. 3 is a schematic diagram illustrating the system with the evaporator system in accordance with some aspects of the present disclosure.

FIG. 3, illustrates the evaporator system introduction to system 10, the evaporator system 30 may comprise an evaporator 0320, a heat source 0322 and inlets such as 164 and 350. The evaporator system 30 operable to evaporate the working fluid instead of direct sending it to the utilizer 220. It also may be used to produce cooling, desalination and or to do other applications internally or externally. The evaporator 350 coupled to be in line between the working fluid source such as the working fluid tank 150 and the other part of the system such as the utilizer/mixer 220 via conduit/fluid transfer device and 162. The evaporator 0320 may also be used to do desalination/distillation, that is, by injecting fluid into the evaporator 0320 via conduit 0350 instead of conduit 0164. In a particular embodiment, the system may use the evaporator 320 as a boiler. Internal and or external thermal sources such as ambient temperature, solar energy, and waste heat can be used to heat the evaporator 0320.

Figure 4:
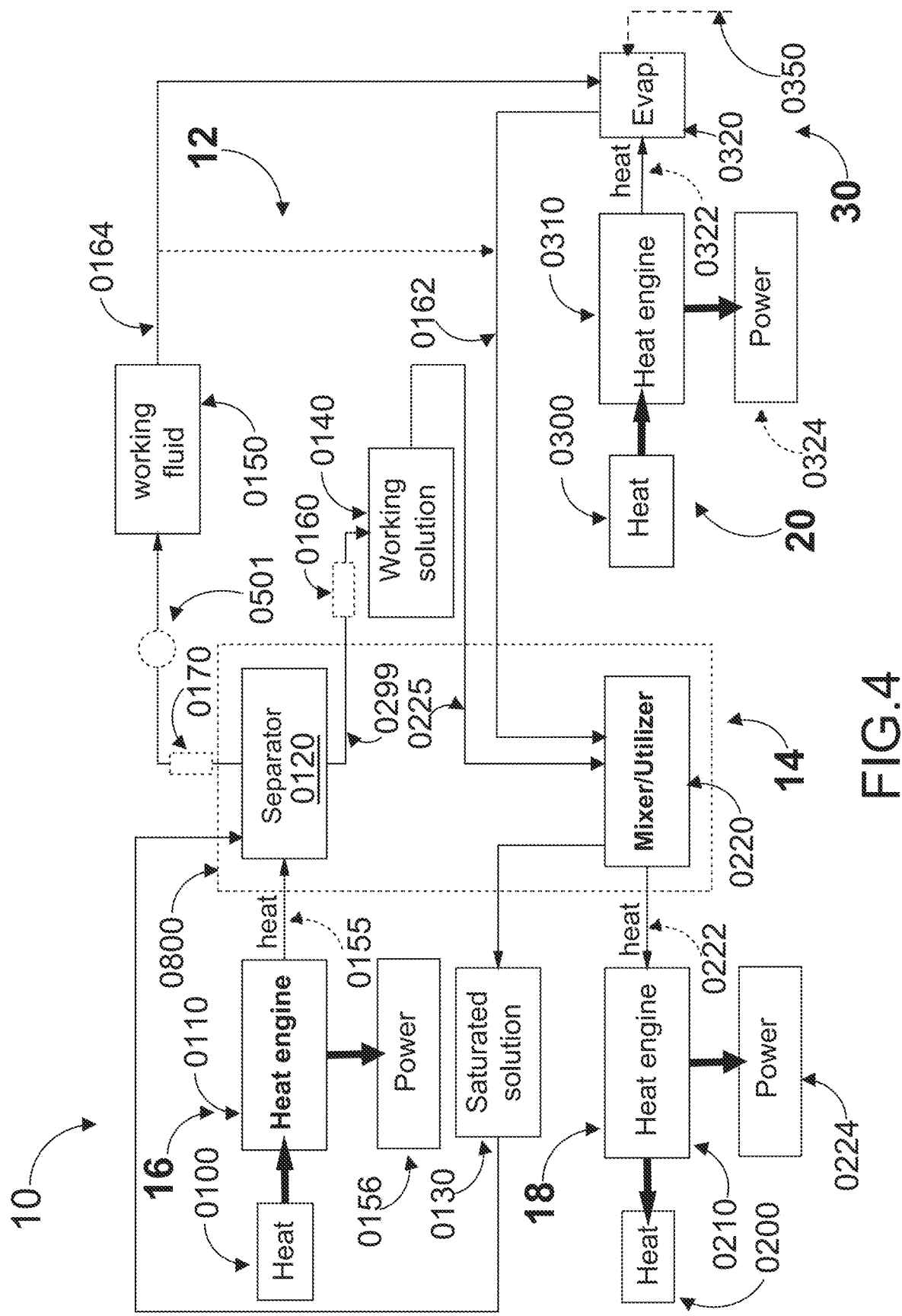
FIG. 4 is a schematic diagram illustrating the system with power generation system in accordance with some aspects of the present disclosure.

FIG. 4, illustrates system 10 with the power generation systems. The power generation systems 16, 18, 20 may make use of the system heat movement/transfer/conduction between the heat sources and the system parts, between the system parts and external applications/devices or the ambient temperature, and among the system part themselves. The power generation systems 16, 18, 20 may comprises heat engines 110, 210, 310, also heat sources 100, 300 and heat outlet such as 200. Power output 156, 224, and 234.

Referring to FIG. 4, the power generation system 16 may comprise a heat engine 110, a heat source 100, heat output 155, and power output 156. The heat engine 110 converts heat or thermal energy to mechanical energy or electrical energy (free piston Stirling engine) and acts as a heat-conducting medium. Thus, the heat engine 110 may transfer heat from the heat source 100, a solar cycle for example, while at the same time providing mechanical and or electrical power.

Referring to FIG. 4, the power generation system 18 may use the energy claiming system 14 to receive energy in the form of heat from the utilizer 220. The power generation system 18 may comprise a heat engine 210, a heat output 200, heat input 222, and power output 224. The heat engine 210 converts heat or thermal energy to mechanical energy or electrical energy (free piston Stirling engine) and acts as a heat-conducting medium. Thus, the heat engine 210 may transfer heat from the heat source 222 for example, while at the same time providing mechanical and or electrical power. The generation system 18 may use the energy claiming system 14 to receive energy in the form of heat from the utilizer 220.

Referring to FIG. 4, the power generation system 20 may use the heat (low) of the evaporator 320 to run a heat engine 310. The power generation system 20 may comprise a heat engine 310, a heat source 300, heat output 322, and power output 324. The heat engine 310 converts heat or thermal energy to mechanical energy or electrical energy (free piston Stirling engine) and acts as a heat-conducting medium. Thus, the heat engine 310 may transfer heat from the heat source 100, a solar cycle for example, while at the same time providing mechanical and or electrical power.

Figure 5:
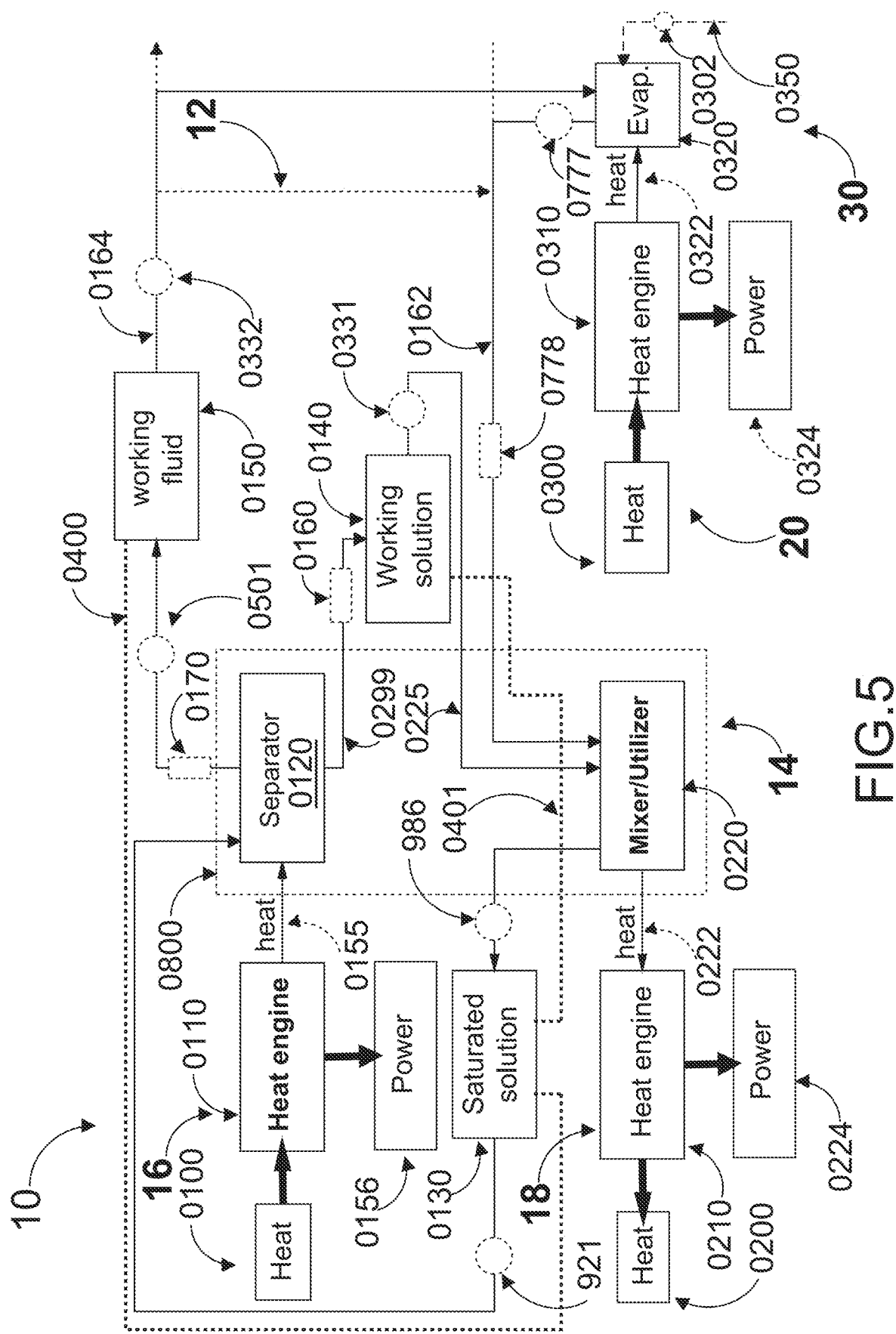
FIG. 5 is a schematic diagram illustrating the system with equalizing pressure conduits in accordance with some aspects of the present disclosure.

FIG. 5 is a schematic diagram of the system in accordance with some aspects of the present disclosure. In the illustrated implementation, the system is configured to separate the saturated solution into the working solution and the working fluid while equalizing pressure between the tanks 0130, 0140, and 0150. The illustrated system includes pressure equalizer conduit 0400 that connects the tank 130 to the tank 0150 and pressure equalizer conduit 0401 that connects tank 0130 to tank 0140. The pressure equalizer conduits 0400 and 401 are configured to substantially equalize pressure among the tanks 0130, 0140, and 0150.

Referring to FIG. 5, the system 10 may also use pumps such as pumps 0331, 986, 921 in order to move fluids among the system parts. Pump 331 may use to move the working solution from the working solution tank 140 to the utilizer 220. Pump 986 may move the saturated solution from the utilizer 220 to the saturated solution tank 130. Pump 921 may move the saturated solution from the saturated solution tanks 130 to the separator 120. The system in some configuration may use a pump between the separator 0120 and the working fluid tank 140.

The system also may make use of the fluid movement such as using fluid generator 302 to make use of the injection proses when the evaporator used in low-pressure state. When the evaporator used as a boiler a turbine/fluid generator 0777 can be used to produce power. A hydro power may use with the storage tanks when they are being elevated such as using hydro generator 332 in order to make use of the hydropower of the working fluid tank 150. The hydropower generators may run/power the system internal parts such as the system pumps and or external application/device/systems such as electrical generators.

The system 10 may use heat exchangers such as 160,170, and 0778. The heat exchanger 160 may use to call the working solution after exiting the separator 120 to the working solution tank 140. The heat exchanger 170 may use to cool and conduce the working fluid. After its departure from the separator 120. Heat exchanger 0788 may use to regulate the fluid temperature in conduit 162 when the evaporator 320 used as boiler. The heat exchanges may also use for desalination/distillation or running other application internally or externally such as running heat engines.

Figure 6:
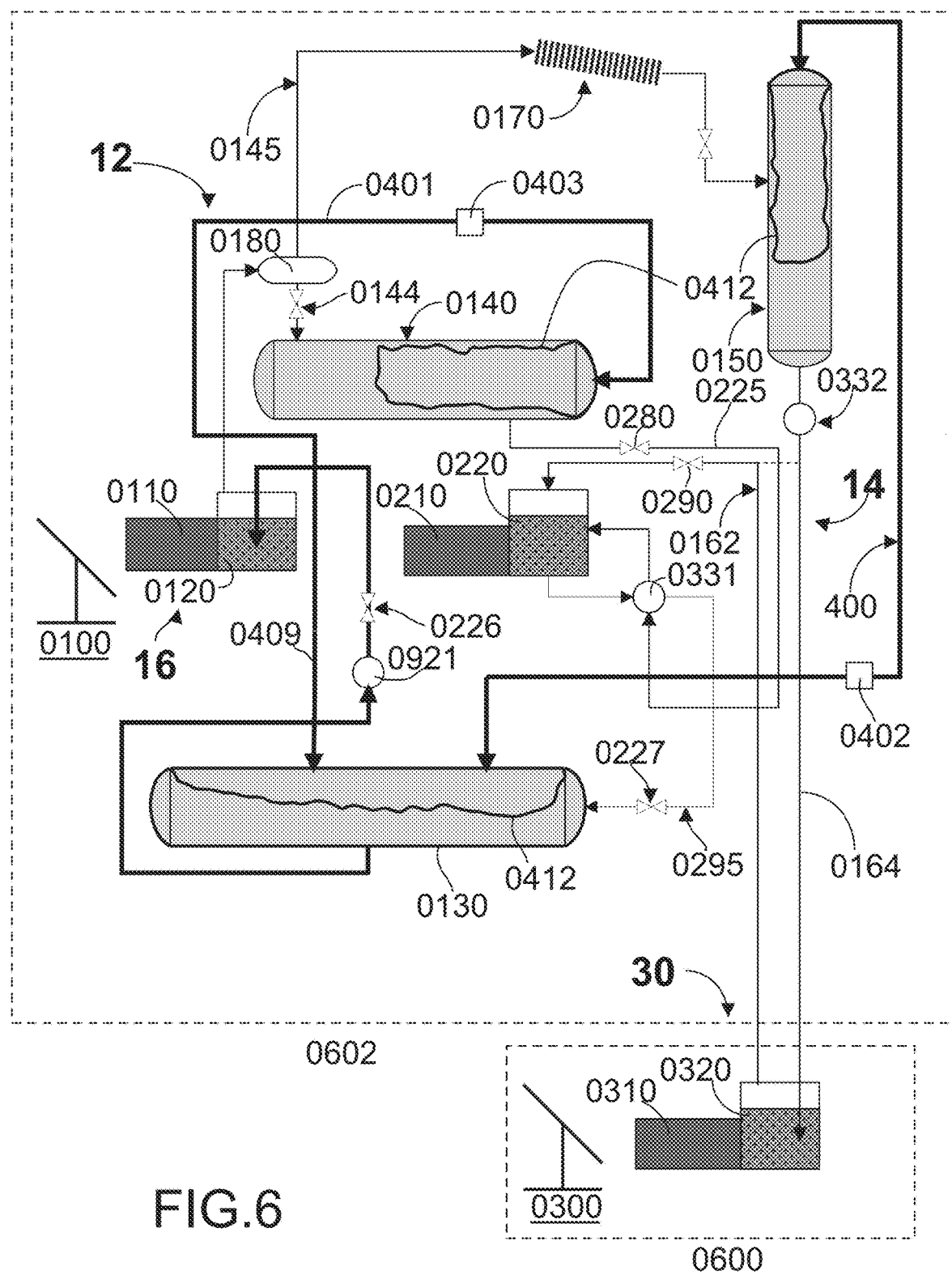
FIG. 6 is a schematic diagram illustrating the system with the separation bags in accordance with some aspects of the present disclosure.

FIG. 6 is a schematic diagram illustrating the system using absorbent as working fluid. The system in accordance with some aspects of the disclosure. In this aspect, the system energy storage system 12 stores the working fluid and the working solution after separation. The power generation system 16 includes a solar concentrator 100 and a heat engine 110 such as a Stirling engine powers the energy storage system 12. The energy storage system 12 includes a boiler/generator 0120, a separator 180, a working-solution tank 0140, a working-fluid tank 150, and a condenser 170. The solar concentrator 100 collects or focuses energy from the sun onto a hot side of the Heat engine 0110. The solar reflector 0100 may, for example, be a concentrated solar power (CSP) unit. The Heat engine 0110 receives heat from the solar reflector 0100 and transfers the heat from the hot side to the cold side while producing mechanical energy or electrical energy. In the illustrated embodiment, the Heat engine 0110 coupled to a boiler/generator 0120 to generate electrical power from the mechanical energy. Other heat sources may be used instead of or with the solar collector. The boiler/generator 0120 boils the saturated solution (e.g., ammonia and water, lithium bromide and water, calcium chloride and water or any suitable substance). The boiler/generator 0120 is coupled to the separator 0180 through one or more conduits. The saturated solution passes (e.g., percolates) through the one or more conduits to the separator 0180. The separator 0180 separates the working solution from the working fluid by evaporating the working fluid. The separator 0180 passes the working solution to the working-solution tank 0140. The separator 0180 passes the evaporated working fluid to the condenser 0170, which condenses the evaporated working fluid to working fluid. The condenser 0170 passes the working fluid to the working-fluid tank 0150. The heat of the separated substances can be used internally or externally for doing desalination, distillation, or any other application, instead of just being wasted.

FIG. 6 is a schematic diagram of an energy claiming system in accordance with some aspects of the present disclosure. In some instances, the energy calming system 14 produces heat from an exothermic reaction. As illustrated, the energy calming system includes a utilizer 220 coupled to a working solution tank 140 and working fluid tank 150, the utilizer also coupled to a saturated solution tank 0130 through one or more conduits. The one or more conduits include values 0227, 0280, and 0290 between the tanks 0130, 0140, and 0150 and the mixer/utilizer 0220. When energy is needed, the working-solution valve 0280 and the working-fluid valve 0290 are opened. The stored working solution and working fluid pass to the mixer/utilizer 0220. The working fluid and the working solution go under an absorption, exothermic chemical reaction, similar to the heat pads and self-heating cans. The by-product of the absorption reaction is a saturated solution, which passes to the saturation solution tank 0130 to be stored and reused again. The heat engine 0210 is coupled to the mixer/utilizer 0220 and receives heat from the mixer/utilizer 0220 and transfers the heat from the hot side to the cold side to produce mechanical energy or electrical energy.

FIG. 6 is a schematic diagram of system in accordance with some aspects of the present disclosure. In some instances, the power system produces electrical and/or mechanical power from an exothermic reaction and as well as produces power other elements of the power system. Referring to FIG. 6, the system uses an evaporator system 30, The evaporator system 30 includes an evaporator 0320 coupled to the working-fluid tank 0150 through the conduit 164 and coupled to the mixer/utilizer 0220 through the conduit 0162. When power is needed, the valve 0280 and valve 0290 are open, the working fluid is injected or otherwise passes through the conduit 0164 to the evaporator 0320, and the evaporator 0320 evaporates the working fluid. In some implementations, the high of the working fluid tank

0150 may enable use of a hydro generator 0332 to produce mechanical and/or electrical power. In these instances, the generator 0332 can be used to drive some of the system parts, such as the system pumps (discharge pump 0331). Hydrogen gas or another gases and substances may use with this arrangement to work in way similar to the rule of the hydrogen in the ammonia water absorption refrigerator.

The evaporated working fluid passes through the conduit 162 to the mixer/utilizer 0220. The working solution passes from the working-solution tank 0140 to the mixer/utilizer 0220. As previously discussed, the working fluid and the working solution go under an absorption, exothermic chemical reaction. The by-product of the absorption reaction is a saturated solution, which passes to the saturation solution tank 0130 to be stored and reused again. In some implementations, a pump 0331 can be used for removing the saturated solution from the absorber 0220 to storage tank 0130. The heat engine such as Stirling engine 0210 is coupled to the mixer/utilizer 0220, receives heat from the mixer/utilizer 0220, and transfers the heat from the hot side to the cold side to produce mechanical energy or electrical energy.

FIG. 6 the system includes a solar concentrator 0300 and a heat engine such as Stirling engine 0310 is coupled to the evaporator 0320. The solar concentrator 0300 collects or focuses energy from the sun onto a hot side of the heat engine 0310. The heat engine 0310 receives heat from the solar reflector 0300 and transfers the heat from the hot side to the cold side while producing mechanical energy or electrical energy for the evaporator 0320. Other heat sources may be used in instead of or with the solar collector. In addition, the system 10 may include conduit 0225 that connections the working-solution tank 0140 to a recovery pump/dual presser pump 0331. In these instances, the pimp 0331 can inject working solution from the working-solution tank 0140 into the absorber 0220 and remove saturated solution from the absorber 0220.

Referring to FIG. 6 is a schematic diagram of the system in some aspects of the present disclosure. In the illustrated implementation, the system is configured to separate the saturated solution into the working solution and the working fluid while equalizing pressure between the tanks 0130, 0140, and 0150. The system may include additional flexible membranes 0412 in the system tanks such as tanks 0130, 0140, and 0150. The flexible membranes 0412 define a cavity that adjusts in volume as the system pressure is equalized and are configured to substantially separate the system fluids such as the working fluid, the working solution, and the saturated solution. In some implementations, the flexible membranes 0412 may be inflatable, expandable bags, membranes, diaphragms, other elements configured to substantially seal and shield the tank fluids from other substances while substantially maintaining the system pressure. In some implementations, the bags may contain inert fluids or and other additives.

Figure 7:
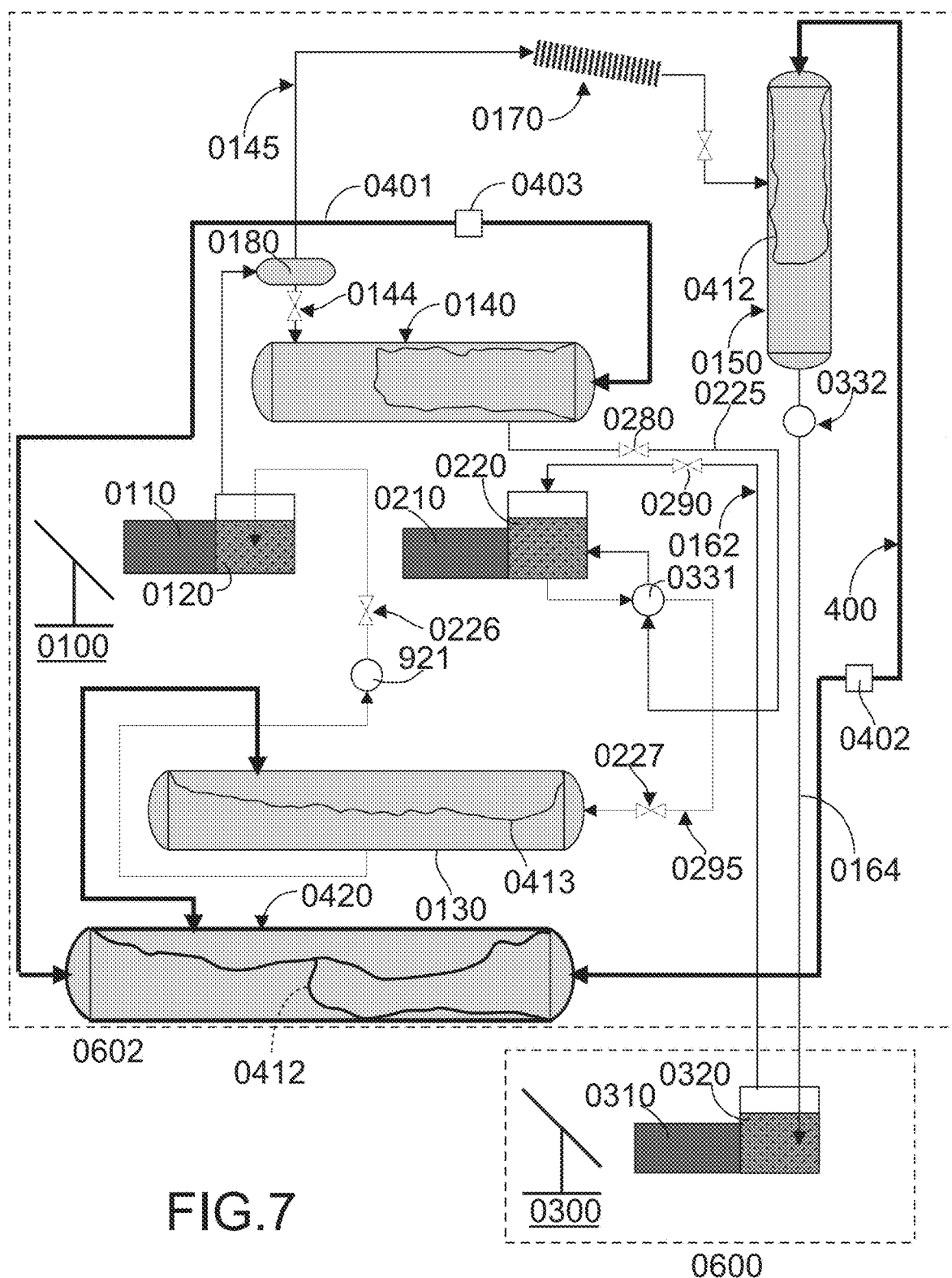
FIG. 7 is a schematic diagram illustrating the system with external pressure equalizer tank in accordance with some aspects of the present disclosure.

FIG. 7 is a schematic diagram of the system in accordance with some aspects of the disclosure. In the illustrated implementation, the system 10 is configured to separate the saturated solution into the working solution and the working fluid while equalizing pressure between the tanks 0130, 0140, and 0150. The system may include an external pressure equalizer tank 0420. The conduit 400 connects the tank 0150 to the external pressure equalizer tank 0420, and the conduit 401 connects the tank 0140 to the external pressure equalizer tank 0420. A third conduit connects the tank 0130 to the external pressure equalizer tank 0420. The external pressure equalizer tank 0420 includes flexible membranes 0412 that three chambers (or more), and each of the chambers are connected to a chamber defined in one of the tanks 0130, 0140, or 0150, the system may use the external pressure equalizer tank 420 alone without the bags of tanks 130,140 and 150 also the system may use all of them together, the storage tanks bags and the external pressure equalizer tanks bags. Any conduit linking arrangement can be used to link the system external pressure equalizer tank 420 and the other system tanks 130,140,150. As previously discussed, the flexible membranes 0412 may be mutable bags, chambers, diaphragms, or other elements (two, three, or more separate bags or bags with several chambers) configured to substantially shield the contents of the tanks 0130, 0140, and 0150 while substantially maintaining the system pressure.

The system may use interaction prevention devices 0402 and 0403 to prevent unwanted interaction between the system fluids. The interaction prevention device can be any method or mean to insure that the working fluid will not pass though the pressure-balancing conduit and react violently with the working solution in the saturated tanks. The interaction prevention device can be for an example, a water filter when water used as working fluid or working solution.

In some implementations, mutable safety measures may be implemented to substantially ensure that no unwanted interaction occurs. For example, the system may use tanks with mutable bags and mutable layers of bags, external pressure equalizer tanks, interaction prevention devices, and/or one-way valves. In some implementations, the system may use naturalizing substances that naturalize the system chemical substances in case of a chamber or bag leak. Detecting devices may be installed to detect leaks and/or warning substances can be used also.

Figure 8:
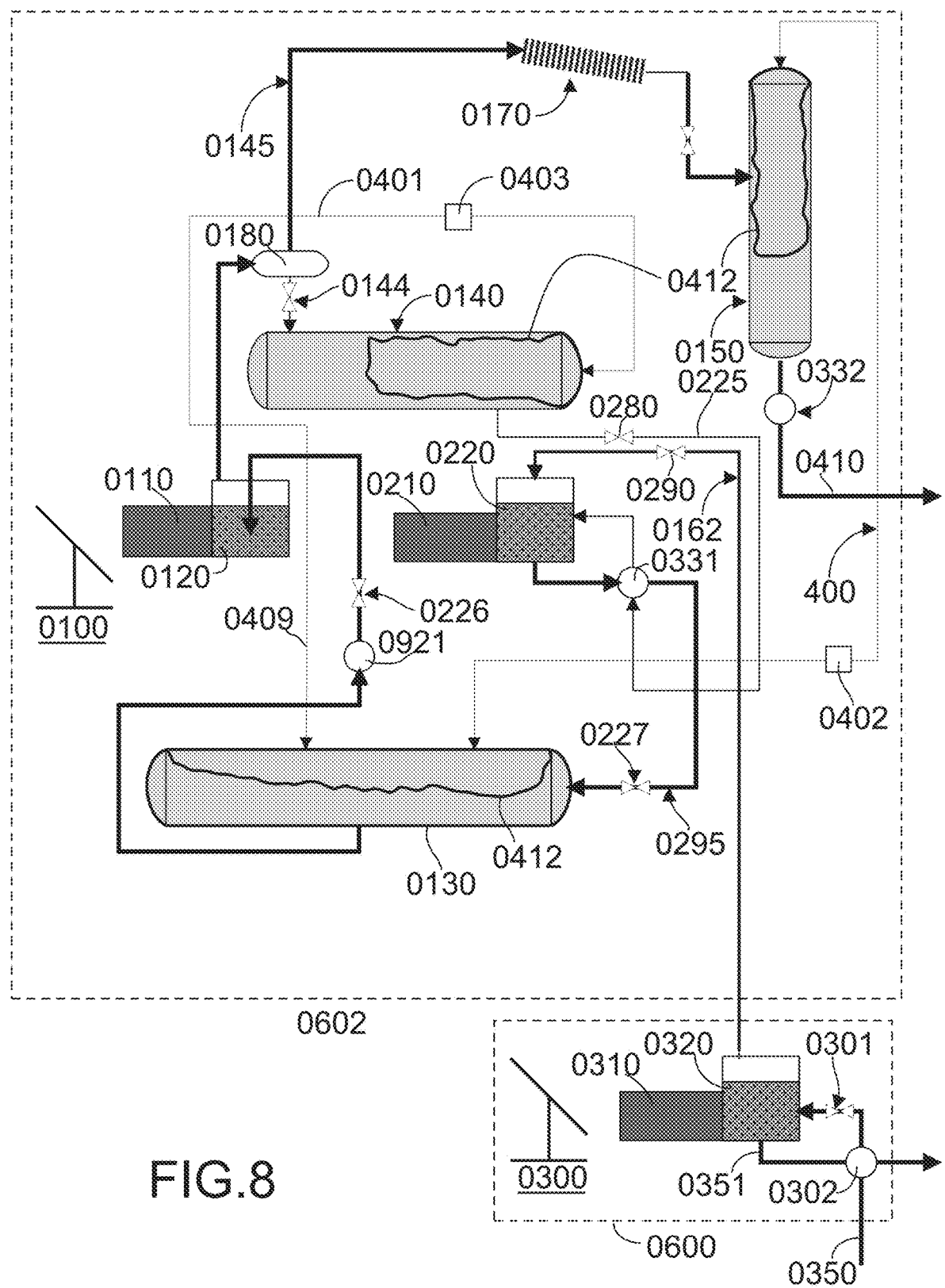
FIG. 8 is a schematic diagram illustrating use of the system for distillation/desalination in accordance with some aspects of the present disclosure.

FIG. 8 is a schematic diagram illustrates the system being configured to desalinate water. In contrast with FIG. 6, the conduit 164 that connects the working-fluid tank 0150 to the evaporator 0320 is removed. Instead, a fluid injector conduit 0350 is connected to the evaporator 0320 and configured to inject saltwater into the evaporator 0320. In addition, a conduit 0410 is connected to the working-fluid tank and configured to discharge fresh water out of the tank 0150.

In some aspects of operation, seawater is injected in the evaporator 0320 via conduit 0350. The absorbent in the absorber 0220 (utilizer/mixer) absorbs water as vapor from the evaporator 0320. After that, the saturate solution (absorbent with working fluid) will depart the utilizer/absorber 0220 to the saturated solution tank 0130. The saturated solution then goes to the generator 0120 from the tank 0130, and then the saturated solution percolates to the separator 0180. At the separator 0180, the saturated solution is separated into a working solution (absorbent) and a working fluid (fresh water). The working solution passed to the tank 0140 for storage. The working fluid (water vapor) is passed to the condenser 0170 to dissipate heat and then stored as liquid in the working fluid tank 0150 to be dispensed for consumption. The working fluid tank (fresh water tank) 0150 can be elevated in order to counter atmospheric pressure or when hydropower is needed.

In some implementations, a pump 0302 (e.g., recovery pump, dual pressure pump) can be used for discharging saturated fluid (seawater). In some implementations, the pump 0302 may be used as a hydropower generator to provide mechanical or electrical power, by making use of the pressure difference between the atmospheric pressure/water pressure and the pressure inside the absorber 0320. The power of the generator may be used for running other parts of the system or any external applications. In some implementations, the system may work without the evaporator 0320 that by subjecting the working fluid (seawater) to the absorption effect of the utilizer/absorber 0220 via conduit 162 without the evaporator 320. In this case, the working fluid will evaporate and then be absorbed as vapor by the absorbent, which is in the absorber 0220.

Figure 9:
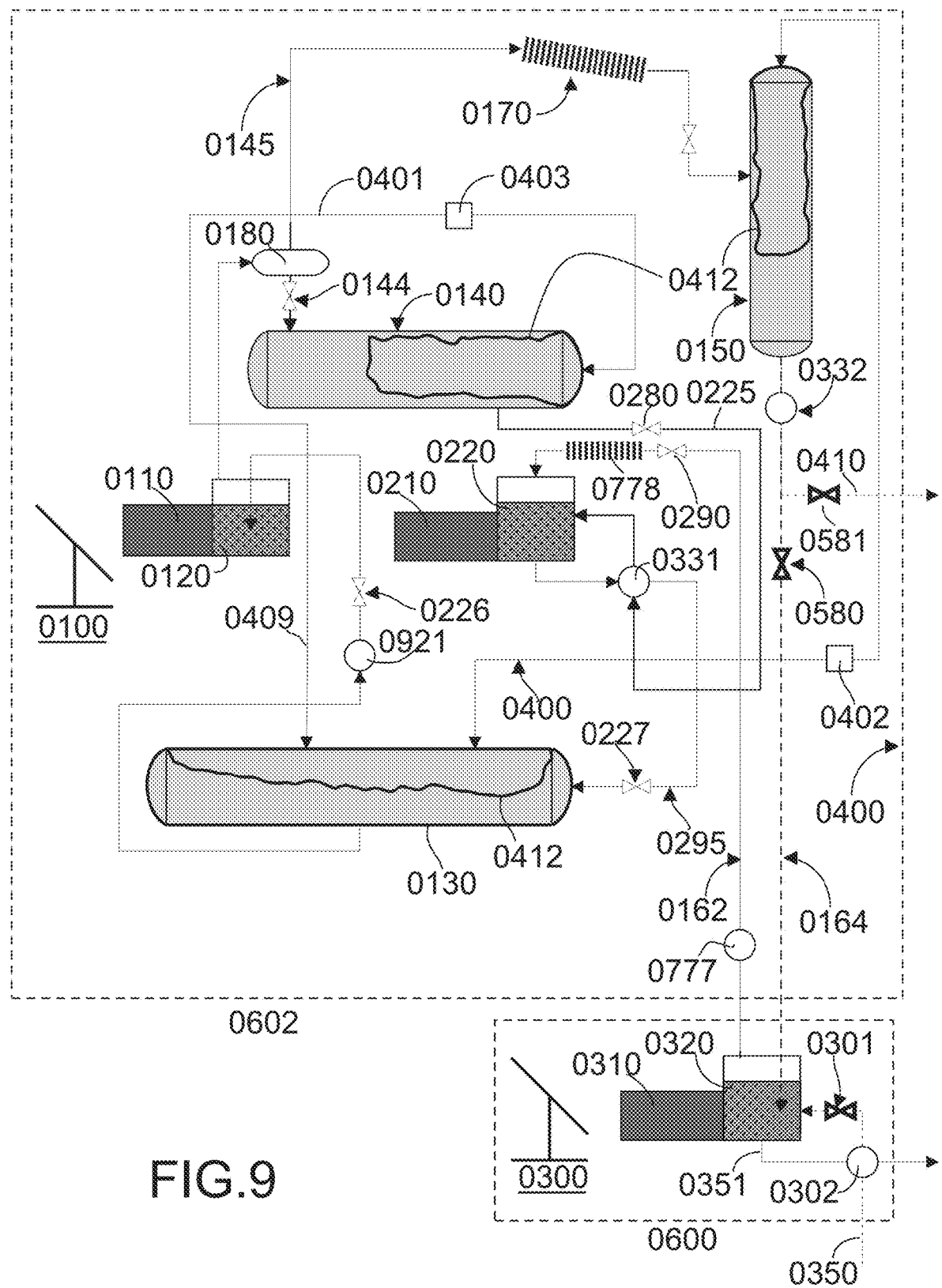
FIG. 9 is a schematic diagram illustrating system ability to work in open and in close cycle modes in accordance with some aspects of the present disclosure.

FIG. 9 is a schematic diagram of the system accordance with some aspects of the disclosure. In the illustrated implementation, the system is configured to work in open cycle mode and in close cycle mode. The system in open cycle mode, valve 0580 is closed, and valves 0581 and 0301 are used. In closed cycle, valves 0581 and 0301 are closed, and valve 0580 is open. Open cycle may be used to produce fresh water (desalination/distillation). Close cycle may be used when water (sea water/salt water) is not available or not needed The system may be configured to power an external device such as an air-conditioner, reverse osmoses plant/system while storing energy as well as while claiming the stored energy, in addition to water desalination/distillation when it is applicable. The heat engines 0110, 0210, and 0310 may power the device mechanically or electrically.

The system may use for doing air conditioning or refrigeration. In some implementations, evaporator 0320 may be used to provide cooling. Moreover, as mentioned previously the system heat engines or other part of the system may use to run external air-condition units. The heat exchangers may provide heating.

Figure 10:
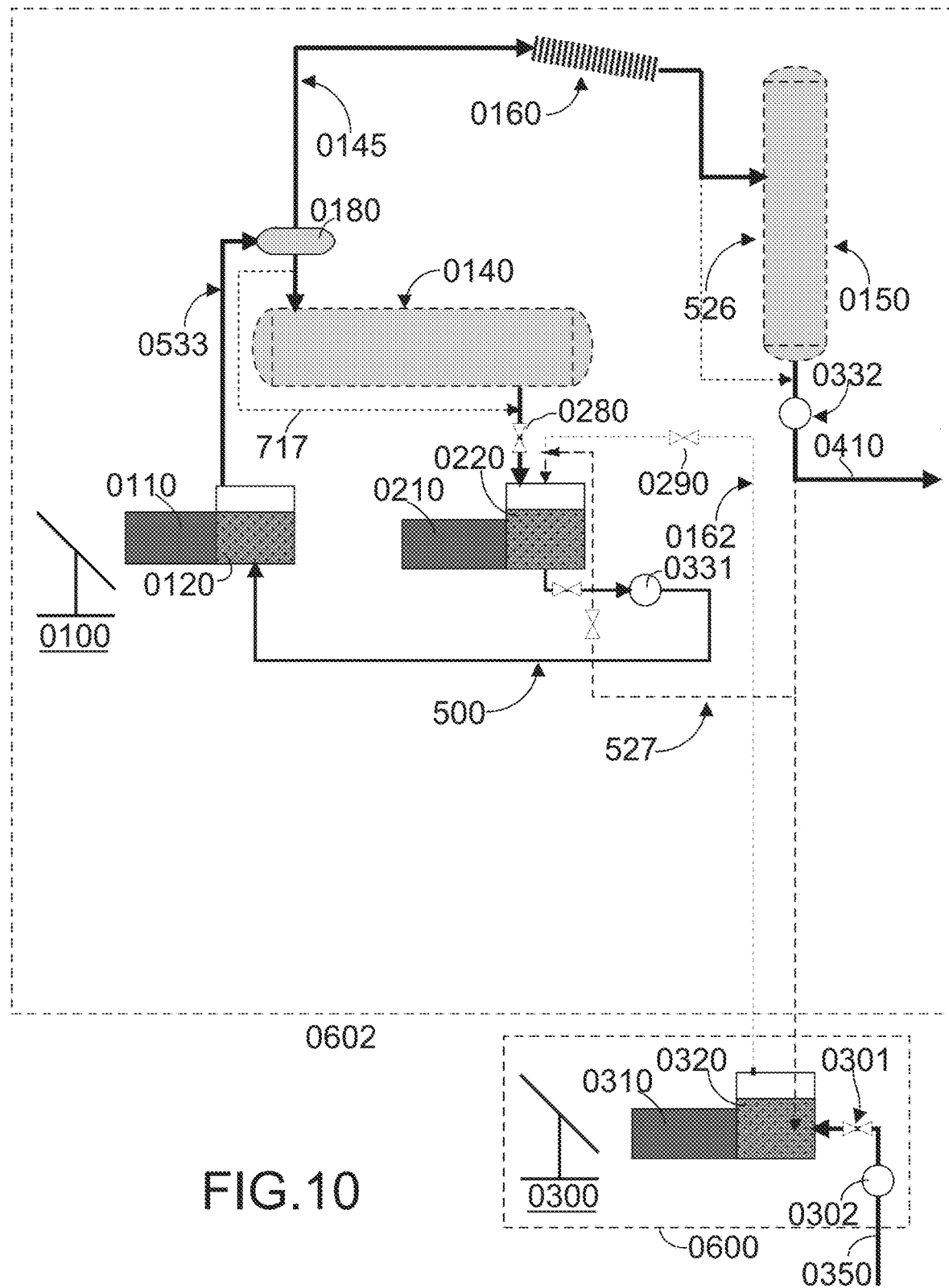
FIG. 10 is a schematic diagram illustrating the system with few or without the storage tanks in accordance with some aspects of the present disclosure.

FIG. 10 diagram illustrated that the system 10 may work with some or without storage tanks; the system can bypass some or all the storage tanks 130,140, and 150. FIG. 10 shows the system 10 operates without the saturated solution tank 130. In contrast to FIG. 6, the absorber 0220 is connected to the generator/boiler 0120 through the conduit 500. In some implementations, a pump 0331 on the conduit 500 may be used to remove saturated fluid from the absorber 0220 and inject into the generator/boiler 0120. In some aspects of operation, when the heat engine 0110 transfers heat to the generator/boiler 0120, the working fluid inside the boiler 0120 evaporates. The evaporated working fluid passes through the condenser 0170 to be liquefied and is then passed to the storage tank 0150 to be discharged for consumption or to be sent to the utilizer again via a conduit 526 or conduit 527 bypassing the evaporator 320. The system 10 may also bypass the working fluid tank 140 with conduit 717.

Figure 11:
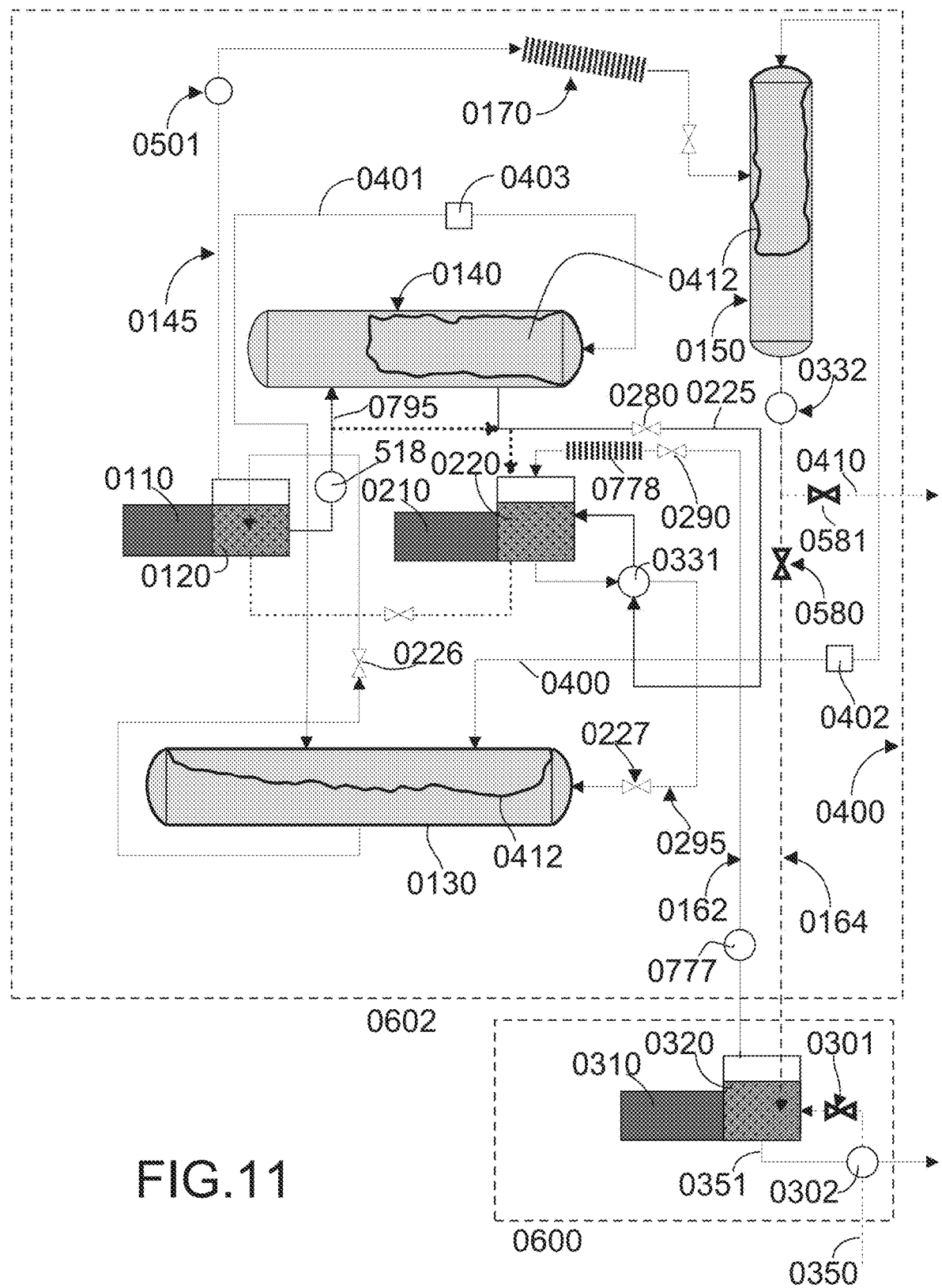
FIG. 11 is a schematic diagram illustrating the system with run by vacuum pump in accordance with some aspects of the present disclosure.

FIG. 11, diagram illustrated that the system may run with a compressor/vacuum pump/turbine. The compressor/vacuum pump/fan 0501 may run by, for example with, a wind turbine, solar VP panels, or other power sources. In some aspects of operation, when the compressor 0501 runs, the evaporator 0120 pressure is lower, which may cause the working fluid to evaporate leaving the working solution inside the evaporator 0120. The working fluid is then condensed via heat exchanger 0170 and then the working fluid sent to the storage tanks 0150. The working solution left in the evaporator 0120 is passed to the working solution tank 0140 with conduit 795 or it may send directly to the utilizer if working solution storage tank is not needed.

In this arrangement, the system generator/boiler/evaporator 120 may receive the saturated solution either by the regular way or by direct link with the utilizer 120 bypassing the saturated solution tank 130 via conduit 500. With the direct linkage there are two option and that depend on wither the working solution tank is going to be use or not. If the working solution tank used then a one-way fluid movement will be maintain from the utilizer to the generator/evaporator via conduit 500. If the working solution tank not use than a direct fluid interaction between the generator/evaporator and the utilizer 120 must occur. When direct interaction occurs, diffusion and conduction effects are going to maintain the generator/evaporator concentration. The mixer/utilizer may absorb the working fluid from the evaporator, generate heat, and increase the working solution saturation. The evaporator evaporates the working fluid and lowering the temperature and the saturation of the working solution. For example, the working solution concentrations maintained between the boiler/generator 0120 and the absorber 0220. Alternation and elevation maybe used to balance the generator and the utilizer pressure and operation.

Figure 12:
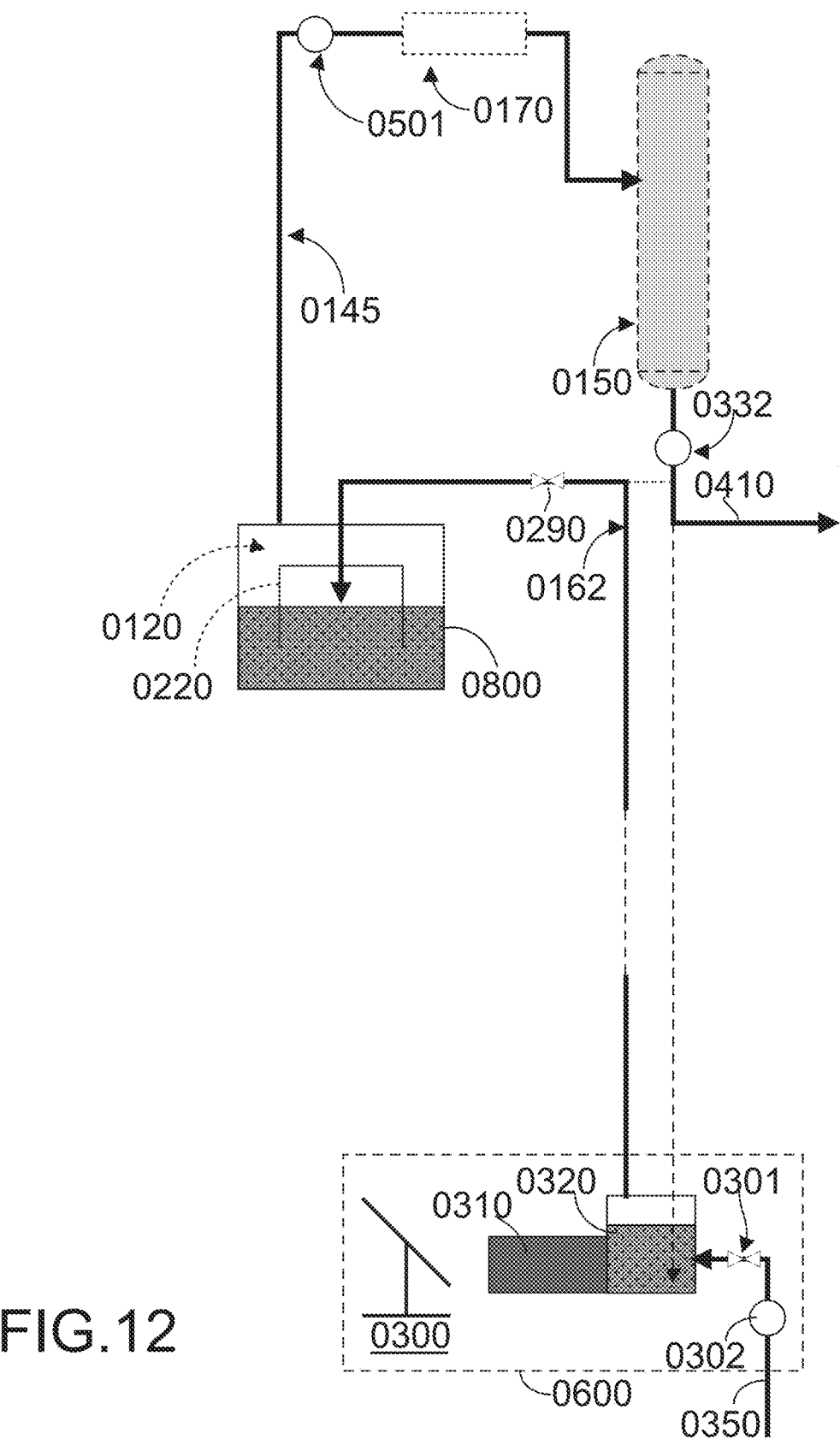
FIG. 12 is a schematic diagram illustrating the combination of the utilizer and the evaporator in one vessel in accordance with some aspects of the present disclosure.

FIG. 12, diagram illustrated that system may accompany or provide the generator and the absorber in one vessel 800 (dual processing vessel). The dual processing vessel 800 includes a chamber 220 configured to operate as an absorber and space between the outer wall of the chamber 220 and the inner wall of the vessel is configured to operate as an evaporator 120. The heat generated in the chamber 220 as result of absorption is used to help in the evaporation process. In some aspects of operation, the pump 0501 (e.g., vacuum pump, turbine) lowers the pressure in the chamber 0120 and pull working fluid as vapor from the vessel 0800. The vapor may pass through a condenser 170 to be condense then goes to a storage tank 150 or directly discharged. The system in this arrangement may bypass the evaporator 320.

Figure 13:
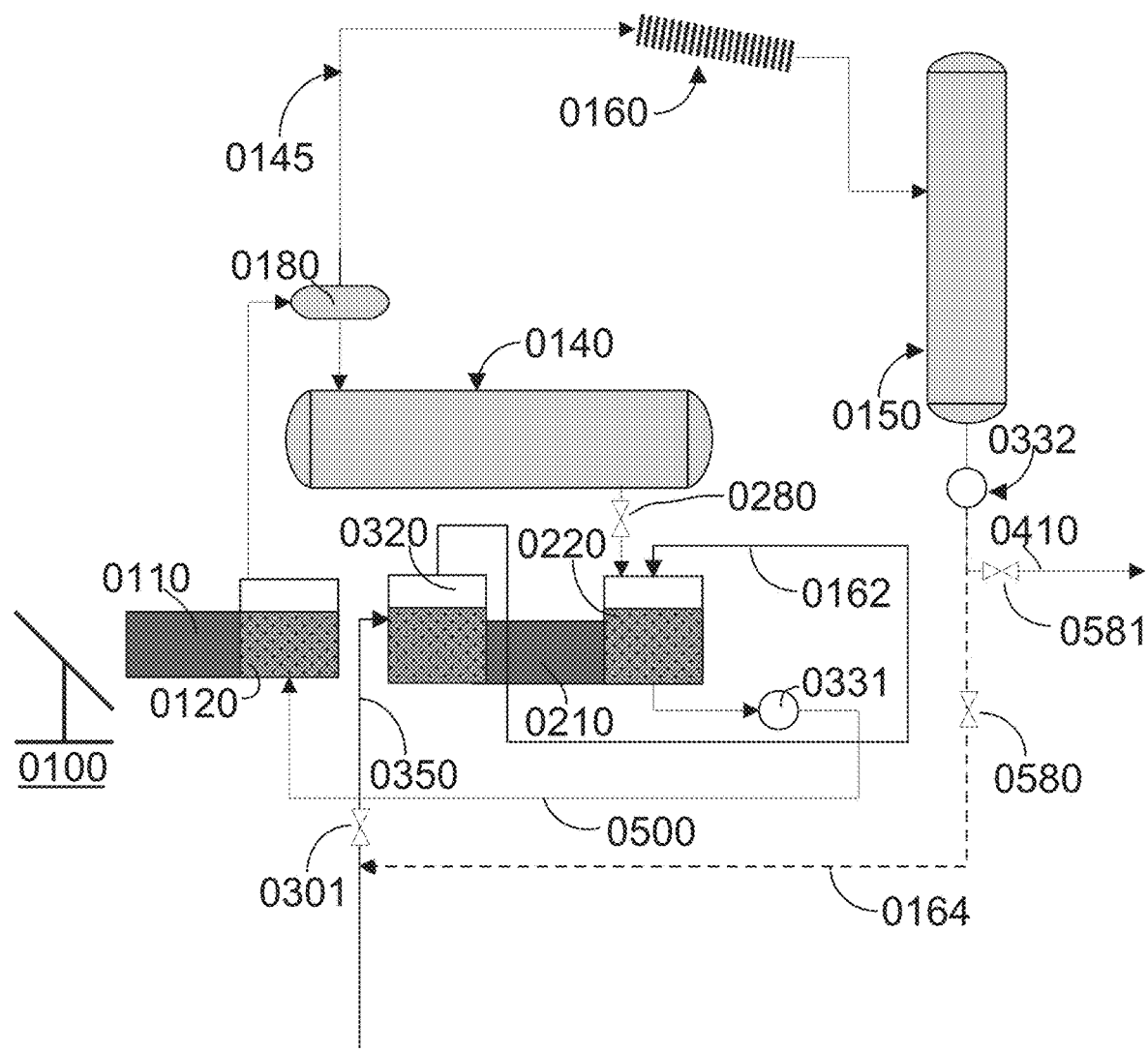
FIG. 13 is a schematic diagram illustrating the sharing of the system thermal parts also, it shows how the system may share the heat engines in accordance with some aspects of the present disclosure.

FIG. 13 is a schematic diagram illustrated that some of the system parts may configured to share/sandwich the system heat engines. FIG. 13 shows the utilizer 0220 and the evaporator 320 share the same heat engine 0210. The absorber 0220 abuts the hot side of the heat engine 0220, and the cold side abuts the evaporator 0320. In addition, the system heat sources such as the evaporator 0320, the absorber 0220, the generator 0120, and the heat exchangers may sandwich the system heat engines; for example, the absorber 0220 and the generator 0120 may sandwich a heat engine (or several heat engines), and the heat exchanger 0160/0170 may share a heat engine with the evaporator 0320. Any other arrangement can be used for sharing the system heat engines. Thermal conduction means can be used for switch and sharing the system thermal resources among the system heat engines and other internal parts, they may use to share and switch among the system internal parts and external applications and among the external application themselves. The thermal conduction means can be a thermal fluid and houses controlled by valves, other suitable mean may be use.

Figure 14:
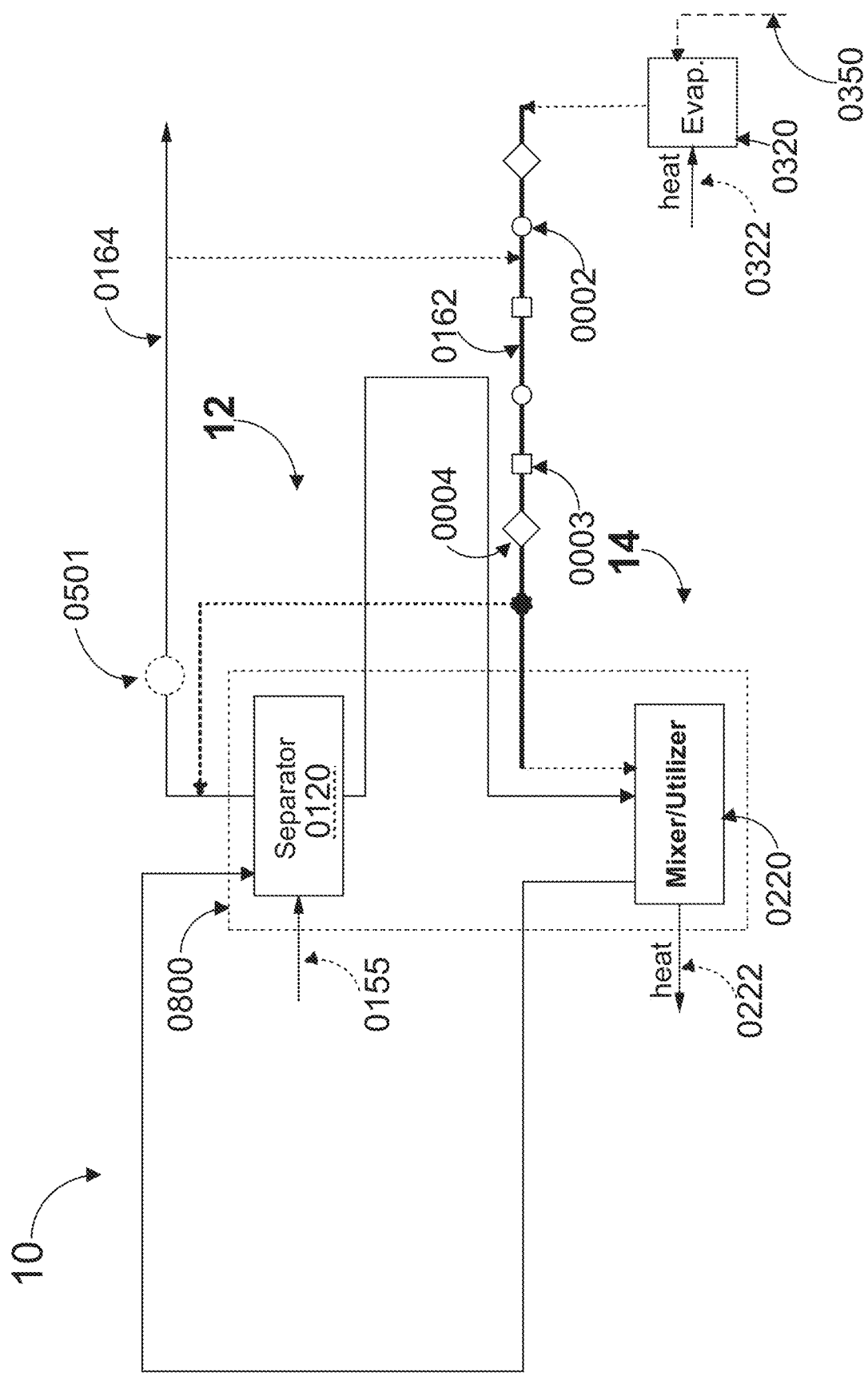
FIG. 14 is a schematic diagram illustrating the fluid transporter in accordance with some aspects of the present disclosure.

FIG. 14 schematic diagrams illustrating a fluid transporter apparatus, the fluid transporter apparatus 162 operable to transport fluid as vapor over distance. The fluid transporter apparatus comprises of a several pipe/tube segments or one pipe divided into several segments, the fluid transporter apparatus may also comprise thermal amplification devices/heaters 0003, electrical static dischargers/regulators 0004, shut off valves 0002, in addition it may composes detection and controller devices. The thermal amplification devices/heaters 0003 are there to prevent the vapor from condensing, and to keep the pressure at a desire points. The electrical static discharge devices 0004 are there to prevent static electricity build up; they can be as simple as electrical ground to earth. The shut off valves 0002 are there to shut off the pipe segments in case of linkage in order not to lose vacuum/pressure. The fluid transporter apparatus 0162 may couple to the utilizer 0220 or directly to the vacuum pump/pump/compressor/turbine 0501 bypassing the utilizer 0220 and the separator 0120. The fluid transporter apparatus 0162 may couple to an evaporator 0230, also it may directly transport the fluid from it source such as sea to wherever needed. The working fluid vapor may be absorbed by the utilizer 220 or suck by the vacuum pump 501. That is going to lower the pressure in the fluid transporter apparatus 0162, which encourage more evaporation/suction from the evaporator 320, or from the fluid sources, regardless of the distances between the evaporator 320 or the fluid source and the utilizer 220 or the vacuum pump 5001. The function of the fluid transporter will be maintained, as long as they are in one contained vessels/conduits and the temperature of the fluid is managed.

FIG. 14, 6, schematic diagrams illustrating that the system as whole may use for transport fluid as vapor. The system can be divided into two units, the evaporation unit 600 and the separation unit 602. The evaporation unit may comprise the evaporator system 30; the separation unit 602 may compose the rest of the system. The system evaporation unit 600 and the absorption unit 602 may be separated over large distances. Referring to FIG. 6, the working fluid vapor may be absorbed by the absorbent, in the utilizer 220, that is going to lower the pressure in the conduit 0162/the fluid transporter apparatus and the is going to lower the pressure in the evaporator 320 which encourage more evaporation from the evaporator 320 regardless of the distances between the evaporator 320 and the utilizer/absorber 220, as long as they are in one contained vessels/conduits.

Figure 15:
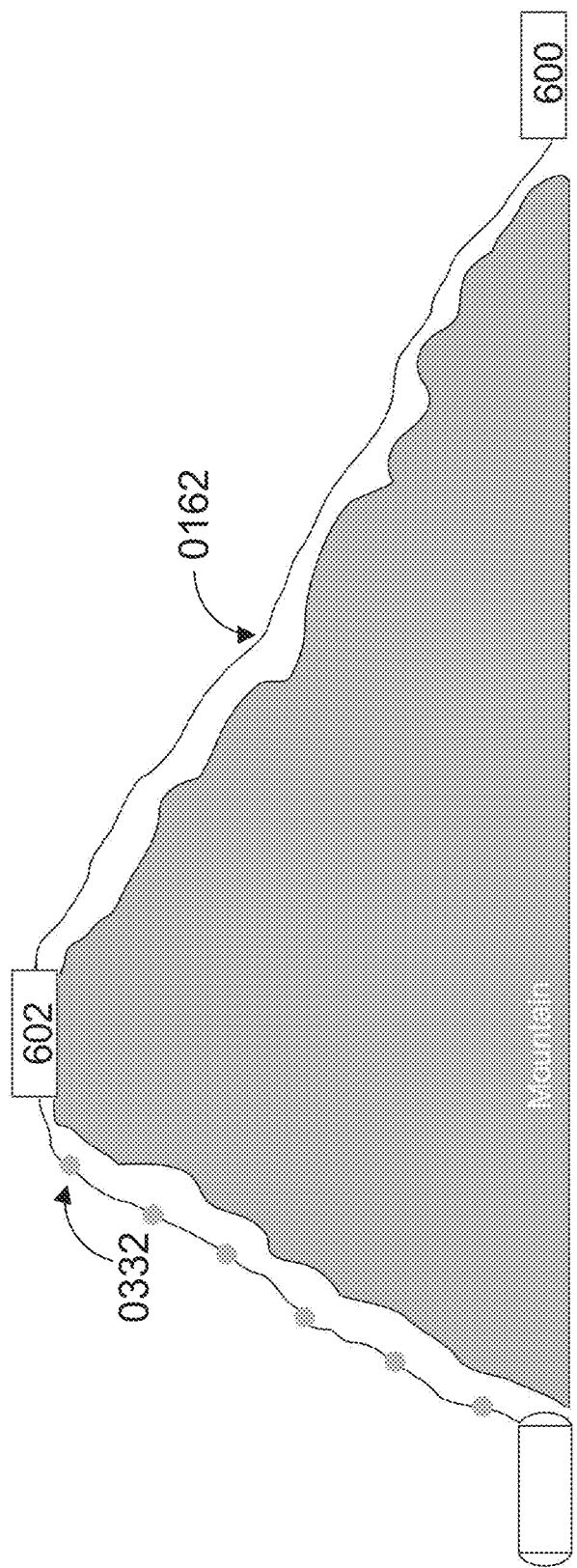
FIG. 15 is a schematic diagram illustrating the use of the system for fluid transportation and the use of the system for hydropower generation in accordance with some aspects of the present disclosure.

Referring to FIG. 15, 6, the evaporation unit 600 can be at sea and the absorption unit 0602 at a desert the absorption unit 602 can be elevated, for example, constructed on a mountaintop. In this case, the working fluid in tank 0150 (freshwater) can be used to run hydro generators and be used for doing mutable hydrogenation, in a way similar to U.S. patent application Ser. No. 14/490,234. With this method, the system may power itself, and it may give extra power. In some implementations, a plurality of power generation stages may be included. In one aspect of the disclosure, the power generation stages may each comprise down-piping, control and other valves and power generators coupled and configured to produce electrical power through the use of the gravitational force of flowing working fluid. The power generators may comprise vertical hydropower generator units, which, when configured or enabled to work with any working fluid, may be vertical hydraulic-power generator units. The vertical generator units comprise generators vertically elevated above the base of the thermo-elevation system. The power generators may comprise a turbine configured to be driven by the flowing working fluid and, in turn, configured to drive an electric generator. In this aspect of the disclosure, the turbine converts the energy of flowing fluid into mechanical energy and the generator converts this mechanical energy into electricity.

A number of embodiments of the invention have been described. Nevertheless, it will be understood that various modifications may be made without departing from the spirit and scope of the invention. Accordingly, other embodiments are within the scope of the following claims. Referring to FIG. 5, the heat of the heat exchangers (0160, 0170), the heat of the absorber 0220, and any rejected heat of the system may be used to provide heat for heating applications. Referring to FIG. 11 and FIG. 15, the system may be divided into more than one units such as the evaporation unit (600) and the absorption unit (602). The two units can be adjacent or apart. In order to avoid some problems that are associated with using high heat with some substances, thermal step-down attachments may be used to lower the heat temperature while maintaining heat transfer from the heat sources to the system parts, such as the separator 0120 and the evaporator 0320. The absorber 0220 may be elevated or its discharged pump linked with an elevated tank to counter the low pressure inside the absorber and to have enough pressure to inject the saturated solution inside the generator 0120.

Low-pressure state may be used to lower the boiling point of some substances. Some substances may need high pressure. Heat exchangers 0160 and 0170 may be used for heating some conduits in the system. Elevation can be used to gain mechanical power to run the system pumps, for example, and also to run some generators. The heat of the system parts (high/low), such as the heat of the evaporator 0320, generator 0120, and the utilizer absorber 0220, may be used for heating or cooling other parts of the system. They may be used for external applications too such as destination, desalination, and air conditioning. Instead of several heat engines, the system may use fewer heat engines than the system uses as heat transfer mediums such as fluids for switching the heat sources between the heat engines terminals; for example, instead of using heat engine 0110 and heat engine 0220, the system may use only one engine. The power of the heat engines may be used to run reverse osmosis systems. Wind energy, hydropower, photovoltaic power (PV), and other sources of energy may be used to run part or all of the system. The separation of the working fluid from the working solution may be partial or complete separation. The system may be divided into more than one part, closely or remotely, via linked conduits or any other transportation means. The system may be configured to be small enough to fit in a house or large enough to power a big city. It may be stationary or mobile. The system may work deep in the desert without relying on water sources when closed cycle is being used. Additives and other substances may be used. Pressure and vacuum may be used. The system parts may be multiplied or omitted. The system may use high heat and noncorrosive absorbents to avoid corrosion and scaling. The system may be a cooling attachment for the thermal power systems or heat engines, in general, and the solar Stirling engine, in particular. The system may solve several problems that are associated with the usage of the solar Stirling engine, which kept it in the back and caused many solar Stirling energy companies to close. Also, this system may add energy-storing capability to those engines. A Scheffler dish may be a good attachment with this combination. A refrigerator or an air-condition designed base on this system may cut the energy consumption into half, and when renewable energy used the system may work for free.

Figure 16:
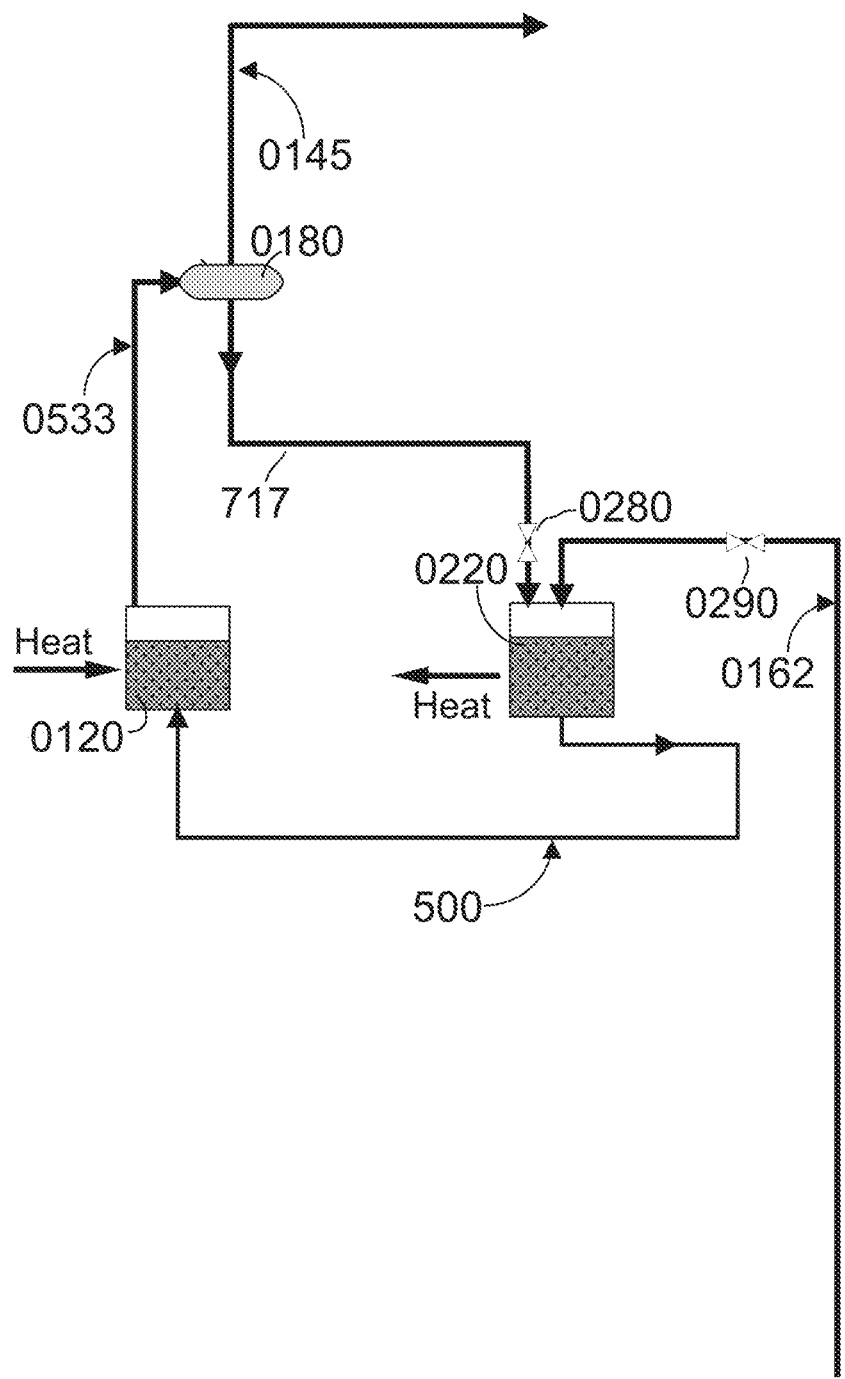
FIG. 16 is a schematic diagram illustrating a system without storage tanks in accordance with some aspects of the present disclosure.

FIG. 16 is a diagram illustrated that the system may work without storage tanks. In contrast to FIG. 6, the absorber 0220 is connected to the generator/boiler 0120 through the conduit 500. In some implementations, the conduit 500 may be used to remove saturated fluid from the absorber 0220 and inject into the generator/boiler 0120. In some aspects of operation, when the heat is transferred to the generator/boiler 0120, the working fluid inside the boiler 0120 evaporates. The boiler/generator 0120 is coupled to the separator 0180 through one or more conduits. The saturated solution passes (e.g., percolates) through the one or more conduits to the separator 0180. The separator 0180 separates the working solution from the working fluid by evaporating the working fluid. The separator 0180 passes the working solution to the absorber 0220. The separator 0180 passes the evaporated working fluid to the conduit 0145. The working fluid introduced to the working solution via inlet 0162, which can be a conduit/fluid transferor apparatus.

Figure 17:
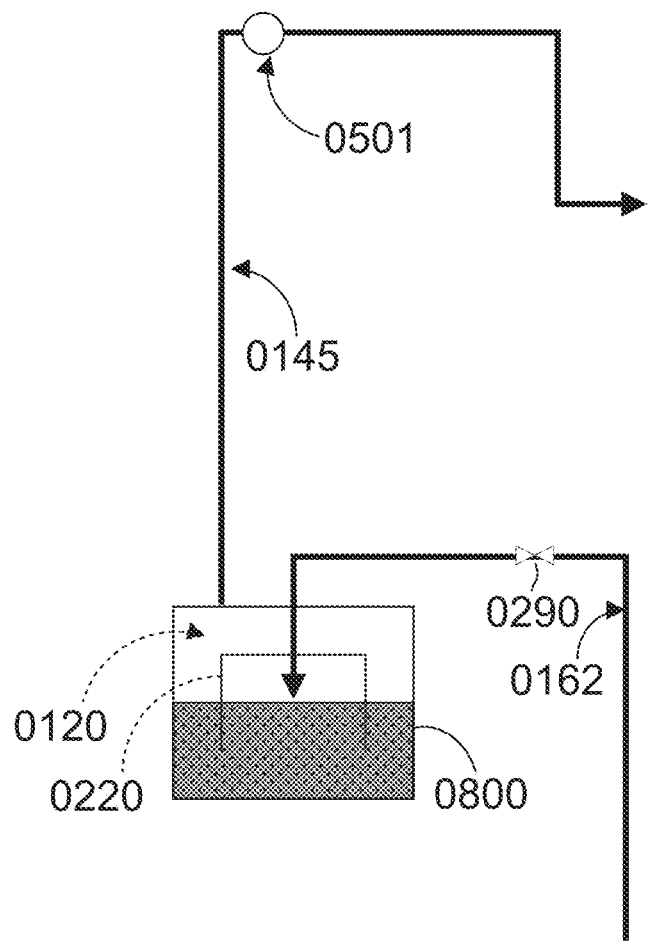
FIG. 17 is a schematic diagram illustrating the combination of the utilizer and the evaporator in one vessel and without storage tanks in accordance with some aspects of the present disclosure.

FIG. 17 is a diagram illustrating a system may include a generator and an absorber in one vessel 800 and without storage tanks. The vessel 800 includes a chamber 220 configured to operate as an absorber and space between the outer wall of the chamber 220 and the inner wall of the vessel is configured to operate as an evaporator 120. The heat generated in the chamber 220 as result of absorption is used to help in the evaporation process. In some aspects of operation, the pump 0501 (e.g., vacuum pump, turbine) lowers the pressure in the chamber 0120 and pull working fluid as vapor from the vessel 0800. The vapor may pass through the conduit 150. The working fluid introduced to the working solution via inlet 0162, which can be a conduit/fluid transferor apparatus.

What is claimed is:

1. A thermal utilization system, comprising:
   a working fluid;
   a working solution, the working solution operable to interact with the working fluid to produce heat for utilization, the working solution further enabling desalination by absorbing water out of saltwater wherein the working solution is an absorbent, and the working fluid is water; and
   a working fluid cycle, the working fluid cycle comprising a utilizer a separator, an encourager, a condenser and conduits coupling them, wherein the working fluid cycle is one of a closed cycle or an open cycle, wherein the working fluid cycle is operable to manipulate the working fluid to produce utilizable heat and cooling to be used for power production or cooling and heating, and wherein the working fluid cycle further enables the system to perform desalination or to transfer fluid for over a distance when the cycle is open;
   wherein the utilizer is coupled to a working solution source and a working fluid source, the utilizer operable to receive the working fluid from the working fluid source and then receive the working solution from the working solution source, the utilizer further operable to interact the working fluid and the working solution to generate heat energy to be utilized externally or internally through a heat engine, the utilizer further operable to enable the system to perform desalination or fluid transfer over a distance when the working fluid cycle is open;
   wherein the separator is operable to receive a saturated solution formed by interacting the working solution and the working fluid, the separator is further operable to separate the working fluid from the saturated solution, the separator further providing cooling for utilization and the separator producing fresh water when the working fluid is water;
   wherein the encourager is coupled to the separator, the encourager is operable to aid separation in the separator, the encourager aiding in evaporating the working fluid inside the separator or aiding in evaporating the working fluidly lowering pressure inside the separator, the encourager enabling the system to produce utilizable heat in the utilizer and in the separator to be used for heating cooling or power production, the encourager further enabling the system to perform distillation desalination or the transfer fluid over a distance when the working fluid cycle is open; and
   wherein the condenser coupled to the utilizer, the condenser is operable to condense the evaporated working fluid to liquid and further provides heat for utilization.

2. The system of claim 1, further comprising an evaporator, the evaporator is coupled to the utilizer and the working fluid source, the evaporator is operable to receive the working fluid as liquid and vaporize the working fluid to a working fluid vapor, the evaporator is further operable to provide cooling to be used for thermal utilization, the evaporator is further operable to receive the working fluid from an external source when the working fluid cycle is open, and the evaporator is further operable to desalinate the working fluid when the working fluid is saltwater received from an external source.

3. The system of claim 1, further comprising at least one heat engine, the at least one heat engine is operable to transfer heat between a heat source and the separator the evaporator the utilizer the condenser a heat exchanger, an external device or the ambient environment.

4. The system of claim 1, further comprising a mode system comprising valves operable to configure the system in open cycle mode or closed cycle mode and to switch between open cycle mode and closed cycle mode.

5. The system of claim 1, further comprising at least one fluid transport device, the fluid transport device coupled to the evaporator and the utilizer to transport the working fluid as vapor over a distance when the working fluid cycle is open.

6. A thermal utilization system, comprising:
   a working fluid;
   a working solution, the working solution operable to interact with the working fluid to produce heat for utilization, the working solution further enabling desalination by absorbing water out of saltwater wherein the working solution is an absorbent, and the working fluid is water; and
   a working fluid cycle, the working fluid cycle comprising a utilizer a separator, an encourager, a condenser and conduits coupling them, wherein the working fluid cycle is one of a closed cycle or an open cycle, wherein the working fluid cycle is operable to manipulate the working fluid to produce utilizable heat and cooling to be used for power production or cooling and heating, and wherein the working fluid cycle further enables the system to perform desalination or to transfer fluid for over a distance when the cycle is open;
   wherein the utilizer is coupled to a working solution source and a working fluid source, the utilizer operable to receive the working fluid from the working fluid source and then receive the working solution from the working solution source, the utilizer further operable to interact the working fluid and the working solution to generate heat energy to be utilized externally or internally through a heat engine, the utilizer further operable to enable the system to perform desalination or fluid transfer over a distance when the working fluid cycle is open;
   wherein the separator is operable to receive a saturated solution formed by interacting the working solution and the working fluid, the separator is further operable to separate the working fluid from the saturated solution, the separator further providing cooling for utilization and the separator producing fresh water when the working fluid is water;
   wherein the heat source is coupled to the separator, the heat source is operable to aid separation in the separator by thermally aiding in evaporating the working fluid inside the separator, the heat source enabling the system to produce utilizable heat in the separator to be used for heating cooling or power production, the heat source further enabling the system to perform desalination or to transfer fluid over a distance when the working fluid cycle is open;

wherein the pump is coupled to the separator, the pump is operable to aid separation in the separator by lowering pressure inside the separator, the pump enabling the system to produce utilizable heat in the utilizer and in the separator to be used for heating or cooling or power production, the pump further enabling the system to perform desalination or transfer fluid over a distance when the working fluid cycle is open; and wherein the condenser is coupled to the utilizer, the condenser is operable to condense the evaporated working fluid to liquid and provide heat for utilization.

7. The system of claim 6, further comprising an evaporator, the evaporator is coupled to the utilizer and the working fluid source, the evaporator is operable to receive the working fluid as liquid and vaporize the working fluid to a working fluid vapor, the evaporator is further operable to provide cooling to be used for thermal utilization, the evaporator is further operable to receive the working fluid from an external source when the working fluid cycle is open, and the evaporator further operable to desalinate the working fluid when the working fluid is saltwater received from an external source.

\* \* \* \* \*